(12) United States Patent
Pourheidari et al.

(10) Patent No.: US 7,925,981 B2
(45) Date of Patent: Apr. 12, 2011

(54) SYSTEMS AND METHODS FOR MANAGING WEB SERVICES VIA A FRAMEWORK OF INTERFACES

(75) Inventors: M. Homayoun Pourheidari, Mountain View, CA (US); Nicolas Catania, Palo Alto, CA (US); Bryan P. Murray, Duvall, WA (US); Guillaume N. Vambenepe, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2709 days.

(21) Appl. No.: 10/438,716

(22) Filed: May 14, 2003

(65) Prior Publication Data

US 2004/0230674 A1     Nov. 18, 2004

(51) Int. Cl.
*G06F 3/048* (2006.01)

(52) U.S. Cl. ........................................ 715/744; 715/735

(58) Field of Classification Search .................. 709/223, 709/224, 204; 717/101; 705/7; 719/328; 715/744, 735, 765
See application file for complete search history.

(56) References Cited

U.S. PATENT DOCUMENTS

| | | | |
|---|---|---|---|
| 6,434,568 B1 * | 8/2002 | Bowman-Amuah | 707/103 R |
| 7,020,697 B1 * | 3/2006 | Goodman et al. | 709/223 |
| 2003/0126136 A1 * | 7/2003 | Omoigui | 707/10 |
| 2004/0064351 A1 * | 4/2004 | Mikurak | 705/7 |
| 2004/0103186 A1 * | 5/2004 | Casati et al. | 709/224 |
| 2004/0230650 A1 * | 11/2004 | Vambenepe et al. | 709/204 |
| 2004/0230943 A1 * | 11/2004 | Pourheidari et al. | 717/101 |
| 2004/0237094 A1 * | 11/2004 | Vambenepe et al. | 719/328 |

\* cited by examiner

*Primary Examiner* — Le Luu

(57) ABSTRACT

A system for managing a Web service comprises a service managed object associated with the Web service. The service managed object includes an interface configured to represent management features for the service to a manager. The manager can access information regarding the Web service via the interface such as a list of conversations associated with the Web service, and the relationship of the service managed object to other managed objects.

39 Claims, 19 Drawing Sheets

SYSTEMS AND METHODS FOR MANAGING WEB SERVICES VIA A FRAMEWORK OF INTERFACES

RELATED APPLICATIONS

The disclosed system and operating method are related to subject matter disclosed in U.S. Patent application no. 10/438,576, entitled "System and Method for Managing Conversations", which is assigned to the same assignee, filed on the same date as the present disclosure, and incorporated by reference herein.

COMPUTER PROGRAM LISTING APPENDIX

This specification includes Appendix A (consisting of five text files) on CD-ROM, which contains examples of interface description documents that can be used with some embodiments disclosed herein. The files on the compact discs are as follows:
1. Conversation Interfaces Description.wsdl (12 KB created May 14, 2003);
2. Event Interfaces Description.wsdl (10 KB created May 14, 2003);
3. Managed Object Interfaces Description.wsdl (22 KB created May 14, 2003);
4. Service Interfaces Description.wsdl (18 KB created May 14, 2003); and
5. WSEE Interfaces Description.wsdl (6 KB created May 14, 2003).
Appendix A is incorporated herein by reference.

BACKGROUND

Today, information technology (IT) resources are managed using a variety of incompatible and often proprietary interfaces and protocols. Requirements for management information regarding the resources need to be specifically programmed to address new resources and in many cases the specific programming is not updated as new versions of the IT resources become available.

The problem of managing disparate IT resources is becoming more acute as systems are increasingly developed using IT resources that are deployed in remote locations and accessed via information networks, such as the Internet. Generally, the resources to be managed are not readily identifiable when the resources are highly distributed and independent of one another. Further, it is difficult to obtain information regarding properties and attributes of the resources, and protocols for exchanging management information with the resources. A further difficulty lies in determining the relationships among the resources used in a system to pinpoint operational problems when one or more of the resources do not respond as expected.

The term Web services, also referred to herein as "services", describes an approach to distributed computing in which interactions are carried out through the exchange of eXtensible Markup Language (XML) messages. Web services can perform any task that can be described and contained within one or more modules of code. For example, functions such as language translation or currency conversion, performing calculations for medical claims processing, and handling certain aspects of travel planning can be implemented in a Web service. Essentially any transaction or bit of business logic can become a Web service if it can be accessed and used by another system over a network such as the Internet.

A Web service is a software system identified by a Universal Resource Identifier (URI) whose public interfaces and bindings are typically defined and described in an XML document. The description can be discovered by other software systems. These systems may then interact with the Web service in a manner prescribed by its definition, using XML based messages conveyed by Internet protocols.

The Web services architecture is based upon the interactions between three primary roles: service provider, service registry, and service requestor. These roles interact using publish, find, bind, and other operations. The service provider is the business that provides access to the Web service and publishes the service description in a service registry. The service requestor finds the service description in a service registry and uses the information in the description to bind to a service.

Web services typically send XML messages formatted in accordance with the Simple Object Access Protocol (SOAP) specification. The SOAP specification is a universally agreed-upon protocol that uses XML and optionally HTTP together to invoke functions exposed in Web services.

The XML messages can be described using the Web Services Description Language (WSDL) specification, which, along with the Universal Description Discovery and Integration (UDDI) registry, provides a definition of the interface to a Web service and identifies service providers in a network. The WSDL specification is an XML-based language used to define Web services and describe how to access them. An application trying to use a particular Web Service uses WSDL to find the location of the Web service, the function calls available, and the format that the client must follow to access the Web service. Therefore, the client first obtains a copy of the WSDL file and then uses the information in this file to format a request, often using SOAP.

The UDDI registry supports Web services by providing a place for a company to register its business and the Web services that it offers. Users that need a Web service can use this registry to find a business that provides the service.

Web services are highly extensible, interact in a loosely coupled manner, and are deployed and utilized via various standard specifications such as SOAP, WSDL, and UDDI. In particular, Web services allow businesses to create processes that span multiple enterprises and define networks based on business partnerships. Enterprises are adopting Web services technology to address their business integration needs, but currently there is no standard framework for managing Web services.

Web services have some characteristics that make them especially challenging to manage. One characteristic is that Web services work together to form a distributed application that may extend across an enterprise or even the Internet. The challenge is that there are many viewpoints from which to manage an application. The management challenges with a distributed application involve crossing boundaries of control and management domains while maintaining a unified, yet customized view for the distributed application. For instance, an IT manager may be interested in managing all of the services in a domain, which includes several computer systems. The vantage point is all Web services on a given computer system. In another instance, a process manager may be interested in all of the Web services that work together to drive a process to, completion. This may involve Web services throughout an enterprise, or possibly include Web services hosted by other companies. Still further, a business manager may be interested in all of the service agreements with the company regarding Web services hosted by other companies. The business manager will be interested in making sure the company meets its service agreements with others. Additionally, the service providers' performance in fulfilling the service agreements will be tracked to provide information for making future business decisions.

Another characteristic that presents management challenges is that Web services have been designed to be extensible at all levels. The SOAP protocol standard provides a very flexible mechanism to extend the processing of messages by adding headers to the message. Additionally, the body of the message may be any XML document that is understood by the Web service. The WSDL and XML-schema description standards provide a means to define arbitrary data types, and to extend or restrict previously defined data types. An XML-schema is a document that describes the valid format of an XML data-set, such as elements that are (and are not) allowed at any point; what the attributes for any element may be; and the number of occurrences of elements.

It is also possible for a Web service to provide several interfaces into its functionality. There are also discovery standards that provide their own extensibility mechanisms. The management challenges with such an extensible system include determining the type of a managed object and how to communicate with the object.

The UDDI standard allows WSDL documents to be discovered at run time. This discovery mechanism is not limited to use only within an enterprise, but is available wherever the Web service is available, including the Internet. Furthermore, it is possible to discover not only the basic capabilities of a Web service, but also the advanced capabilities that are specified by this standard. One management challenge with such a powerful discovery mechanism is to ensure that provided services are protected with the proper type of security. Another management challenge is identifying users accessing the provided Web services. Yet another more complex management challenge is to ensure that all appropriate service agreements are not only discoverable but also enforced.

SUMMARY

In one embodiment, a system for managing a Web service comprises a computer processor and a service managed object executable on the computer processor. The service managed object is associated with the Web service and includes at least one interface configured to allow a manager to access management features for the Web service, such as a list of conversations associated with the Web service.

In another embodiment, a system capable of managing a Web service comprises a computer processor configured to communicate with the service. The computer processor includes executable instructions operable to discover a managed object interface for the service; capabilities for managing the service based on the managed object interface for the service; a service interface for the service; and additional capabilities for managing the service based on the service object interface.

In yet another embodiment, a computer program product comprises a service interface and a managed object interface associated with the service interface. The service interface is configured to include information for managing a Web service, including information indicating conversations associated with the service that are in progress.

In a further embodiment, a method for managing a service comprises creating a service object representing the service, wherein the service object includes a management interface; exposing management capabilities for the service via a description of the management interface; and allowing a manager to subscribe with the service object to receive notification of events regarding the service.

Various other features and advantages of embodiments of the invention will be more fully understood upon consideration of the detailed description below, taken together with the accompanying figures.

DETAILED DESCRIPTION OF THE FIGURES

Figure 1A:
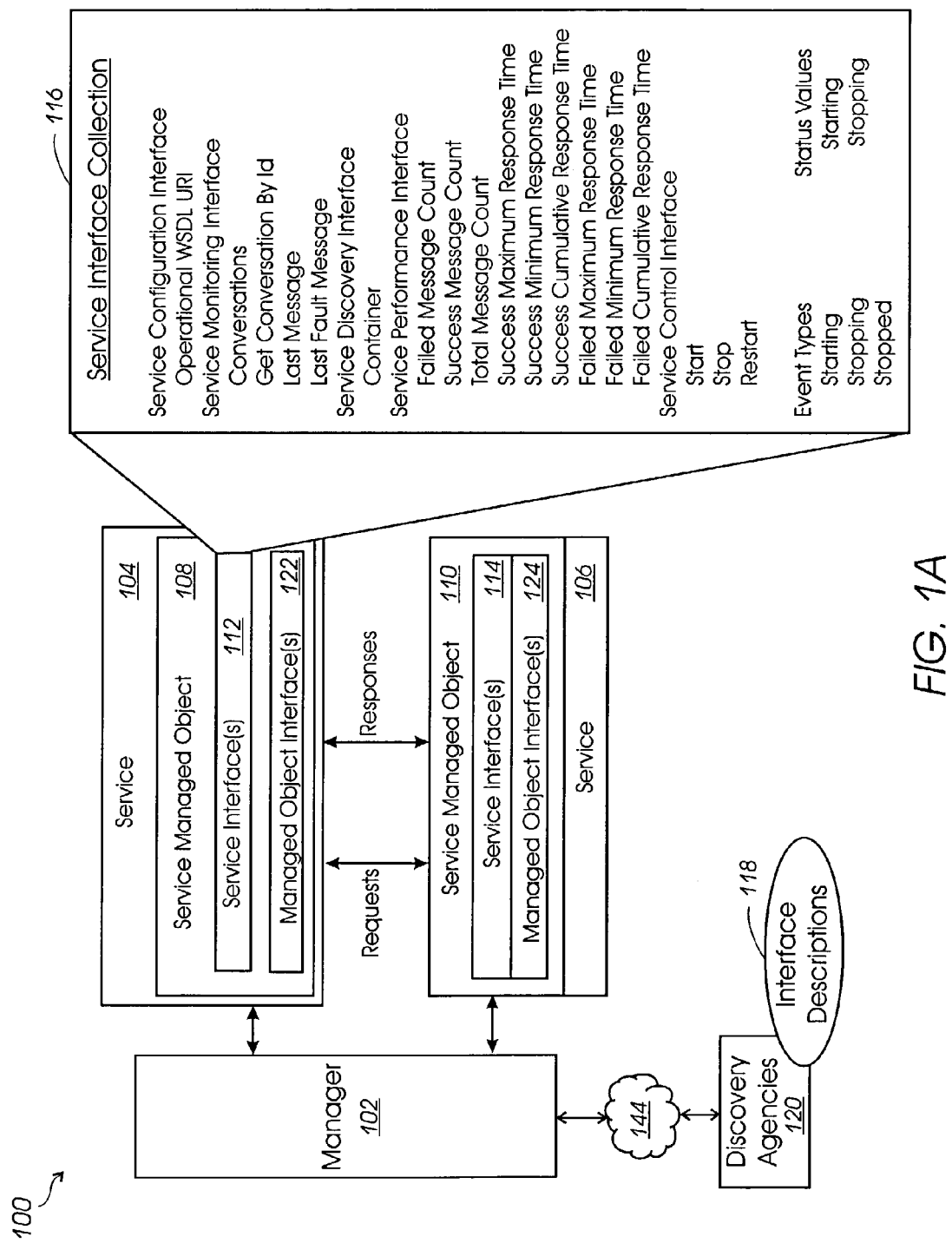
FIG. 1A is a diagram of components included in an embodiment of a Web service management system.

Referring to FIG. 1A, an embodiment of a Web service management system 100 that allows manager 102 to monitor and control one or more services 104, 106 is shown. Service managed objects 108, 110 represent the management features of resource(s) that perform services 104, 106. Interfaces in one or more categories can be included in service interfaces 112, 114 for each service managed object 108, 110. Service interfaces 112, 114 can allow manager 102 to access information regarding the state of services 104, 106, as well as to control the operation of services 104, 106.

In some embodiments, management capabilities provided via service interfaces 112, 114 include attributes that represent information about the messages exchanged with other services; operations to support the management of services 104, 106; and events representing exceptions and state changes that can be reported by service managed objects 108, 110 to manager 102. Service managed objects 108, 110 can be implemented within services 104, 106, such as shown for service managed object 108, or in a layer external to services 104, 106, as shown for service managed object 110.

Services 104, 106 populate data fields in service interfaces 112, 114 that are available to manager 102. Further, services 104, 106 receive information and control parameters from manager 102 via service interfaces 112, 114.

In some embodiments, each collection of service interfaces 112, 114 supports various categories of management capabilities including managed object identity, monitoring, discovery, control, performance, configuration, and security. Other interfaces that support additional service management capabilities can be utilized, in addition to, or instead of, service interfaces 112, 114.

An embodiment of service interfaces 112 is represented in FIG. 1A as Service Interface Collection 116, which will be described with respect to service interfaces 112 and service 104. A similar Service Interface Collection 116 can be used to develop service interfaces 114. Service interfaces 112, 114 can include additional, fewer, or the same features shown in the embodiment of Service Interface Collection 116 in FIG. 1A.

Each interface in Service Interface Collection 116 includes at least one management feature that can be used by manager 102 to monitor and/or control various aspects of service 104. In the embodiment shown, Service Interface Collection 116 includes a Service Configuration Interface, Service Monitoring Interface, Service Discovery Interface, Service Performance Interface, and Service Control Interface. Service interfaces 112, 114 can be configured to support any one, a group, or all of the interfaces in Service Interface Collection 116.

Further, in some embodiments, manager 102 can discover interface descriptions 118 for service interfaces 112, 114 via a suitable discovery agency 120, such as UDDI, or other suitable method. Interface descriptions 118 can be configured to reveal selected management information to manager 102 by exposing only selected interfaces in service interfaces 112, 114. For example, an interface description 118 for service interfaces 112, 114 may only include a description the Service Monitoring Interface that is exposed to manager 102. Examples of interfaces descriptions 118 that are suitable for use with some embodiments disclosed herein are provided in Appendix A.

Moreover, features such as attributes in Service Interface Collection 116 can support types of access by other objects, such as read and read/write. When interface descriptions 118 are implemented in WSDL, service interfaces 112, 114 are mapped to ports, as further described herein. Service Interface Collection 116 can also be extended to provide additional management capabilities for manager 102, as described herein.

In the embodiment shown in FIG. 1A, Service Configuration Interface includes OperationalUri, which can represent an attribute that can return an identifier such as an URI to the location of interface descriptions 118 for service 104.

Service Monitoring Interface can include attributes for Conversations, Get Conversation By ID, Last Message, Last Fault message.

Conversations can represent an attribute that can return a list of conversations (not shown) involving the corresponding service managed object 108 that are in progress.

The Get Conversation By ID (identifier) can represent an attribute that can return the conversation managed object (not shown) associated with the service that has the specified identifier. An example of a suitable identifier is a Universal Resource Identifier (URI) that can be used to identify resources in a domain including documents, images, downloadable files, services, electronic mailboxes, and other resources. Other suitable identifiers can be utilized.

The Last Message can represent an attribute that can return the last request message received by service 104.

The Last Fault Message can represent an attribute that can return the last fault message returned from service 104.

Service Discovery Interface can include a Container read-only attribute, which returns a globally unique identifier for the Web service execution environment (WSEE) (not shown) that contains service 104.

Service Performance Interface can include attributes such as Total Message Count, Failed Message Count, and Success Message Count. Total Message Count can return the total number of messages processed by service 104. Failed Message Count can return the number of failed messages processed by service 104. Success Message Count can return the number of successful messages processed by service 104.

Service Performance Interface can include additional features as shown in FIG. 1A. For example, Success Message Count can represent an attribute that returns the number of successful messages processed by service 104.

Success Maximum Response Time can represent an attribute that can return the maximum amount of time that successful operational requests executed before returning a response.

Success Minimum Response Time can represent an attribute that can return the minimum amount of time that successful operational requests executed before returning a response.

Success Cumulative Response Time can represent an attribute that can return the cumulative amount of time that successful operational requests have executed since service 104 was started.

Failed Maximum Response Time can represent an attribute that can return the maximum amount of time that failed operational requests executed before returning a response.

Failed Minimum Response Time can represent an attribute that can return the minimum amount of time that failed operational requests executed before returning a response.

Failed Cumulative ResponseTime can represent an attribute that can return the cumulative amount of time that failed operational requests have executed since service 104 started.

Service Control Interface can include operations such as Start, Stop, and Restart that allow manager 102 to control the execution of service 104. The Start operation starts service 104. Once started, service 104 should be able to receive operational and management requests supported by service interfaces 112 and managed object interfaces 122.

The Stop operation stops service 104. Requests from manager 102 can be processed by service 104 once service 104 has been stopped, but any operational requests should result in a fault message or a not found status being returned to the requestor. If a particular implementation of service 104 does not support the stop capability, a fault can be returned.

Service Interface Collection 116 can also include Event types and Status values. Event types include Starting, which can indicate service 104 has just entered the Starting state; Stopping, which can indicate service 104 has just entered the Stopping state; and Stopped, which can indicate service 104 has just completed the Stopping state and is no longer able to process operational requests. Service 104 can enter the Inactive state after the Stopped event. An Event represents a change in the state of a corresponding object, for example, service 104. Manager 102 can register to receive notification of one or more of the Event types available in Service Interface Collection 116.

Status values in Service Interface Collection 116 can include values such as Starting and Stopping to indicate the state of the corresponding service. The Starting status value can be used when the underlying resource(s) used in service 104 are transitioning from the Inactive state to the Operational state. The Stopping status value can be used when the underlying resource(s) are transitioning from the Operational state to the Inactive state.

The preceding types, operations, status values, event types, and attributes are examples of features that can be included in Service Interface Collection 116. Other features can be implemented for Service Interface Collection 116 in addition to, or instead of, the preceding features. Further, the names for the interfaces, attributes, events, operations and other interface features disclosed herein are provided for purposes of illustration only. The same names can be used to represent different features, and other names can be implemented to represent features disclosed herein.

Managed Objects Interfaces

Figure 1B:
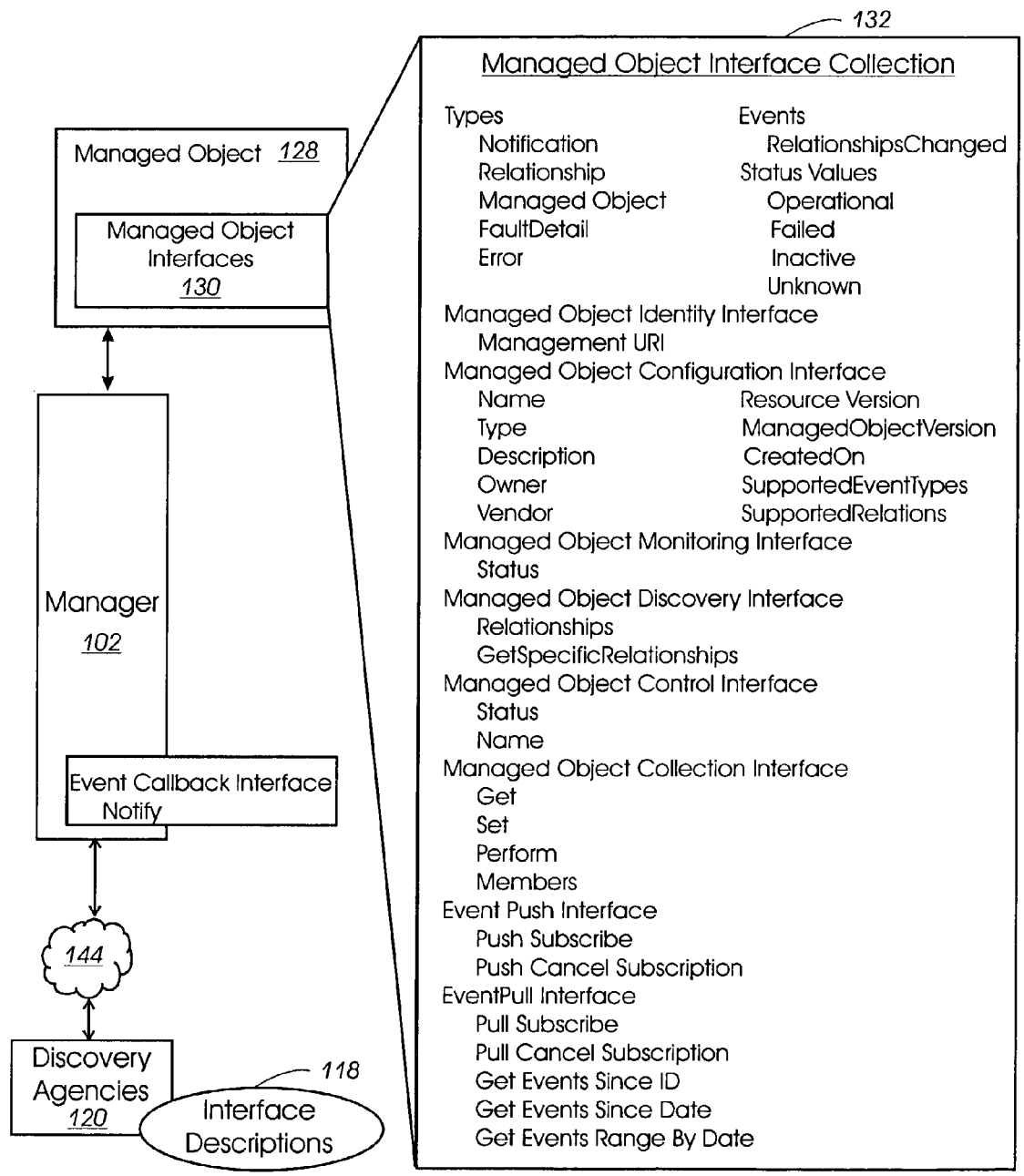
FIG. 1B is a diagram of components included in an embodiment of a base managed object interface collection for the Web service management system of FIG. 1A.

FIG. 1A also shows managed object interfaces 122 associated with service managed object 108, and managed object interfaces 124 associated with service managed object 110. Referring to FIG. 1B, an embodiment of managed object 128 with managed object interfaces 130 is shown. Managed object 128 is a management representation of a resource. For example, service managed objects 108, 110 in FIG. 1A can be considered managed objects 128.

Managed object 128 implements managed object interfaces 130 to provide a common set of basic management capabilities that allow manager 102 to monitor and/or control the underlying resource(s) represented by managed objects 128 through various features such as attributes, operations, and event notifications. Various implementations of managed object interfaces 130 can hide some or all of the management capabilities from managers 102 that are not authorized to access specific management capabilities.

In some embodiments, each managed object 128 inherits managed object interface 130, which can be implemented as part of each managed object 128, or in another layer outside of managed object 128. Each managed object 128 can also include one or more additional interfaces based on the associated resources that expose relevant information to manager 102. For example, service managed objects 108, 110 implement service interfaces 112, 114, as well as managed object interfaces 122, 124 (FIG. 1A).

Interface descriptions 118 for managed object interfaces 130 can be used in some implementations to expose management capabilities available for managed object 128 to manager 102. Interface descriptions 118 allow manager 102 to determine the objects that can be managed, and the attributes of related managed objects 128. Managed object interfaces 130 can also allow manager 102 to access information to monitor, audit, and control various aspects of managed objects 128, and to register to receive event notifications.

The embodiment of Managed Object Interface Collection 132 shown in FIG. 1B includes Notification, Relationship, Managed Object, Fault Detail, and Error Types that can be implemented in managed object interfaces 130.

Notification type can be used to send event notifications for which manager 102 has subscribed. Relationship type can describe a relationship between two or more managed objects 128. Managed Object can be a simple type based on the XML schema anyURI type and points to interface descriptions 118 for a particular managed object. An element of FaultDetail type can be added to the fault detail element of all SOAP faults returned by managed object interfaces 130, and other interfaces associated with particular types of managed objects 128, such as conversations interfaces 112, 114 associated with conversations 104, 106. Error type can describe an error. The Fault Detail element type can contain one or more of the Error type elements to offer more specific information about the error.

Managed Object Interface Collection 132 can also include Status values and Events. For example, the type Relationships Changed Event can indicate an update to relationships in managed object 128. Relationships Changed Event can occur when a new relationship is added or when a previous relationship has been removed.

With regard to status values included in the embodiment of Managed Object Interface Collection 132 shown in FIG. 1B, Operational status can indicate the underlying resource is operational and ready to process incoming messages. Failed status can indicate managed object 128 has detected a problem and the underlying resource is unable to process incoming messages. Inactive status can indicate the underlying resource has terminated normally. Unknown status can indicate the state of the resource is unknown.

Interfaces shown in the embodiment of Managed Object Interface Collection 132 of FIG. 1B include Managed Object Identity Interface, Managed Object Configuration Interface, Managed Object Monitoring Interface, Managed Object Discovery Interface, Managed Object Control Interface, Managed Object Collection Interface, Event Push Interface, Event Pull Interface. An Event Callback Interface can be implemented by a subscriber, such as manager 102, to receive push events.

Managed objects 128 can implement Management Object Identity Interface, which includes attribute ManagementUri. ManagementUri returns an identifier, such as a URI, for interface descriptions 118 of managed object interfaces 130.

Managed Object Configuration Interface can include several attributes regarding the configuration of associated managed object 128, such as Name, Type, Description, Owner, Vendor, Resource Version, Managed Object Version, Created On, Supported Event Types, and Supported Relations.

Name can represent an attribute that can return the name of managed object 128. Name can be a read-write attribute; however, the write portion can be handled in another interface, such as the Managed Object Control Interface, as further described herein.

Type can represent an attribute that returns the type of managed object 128.

Description can represent an attribute that returns a description of managed object 128. Manager 102 can present the description when a user requests more information regarding a particular managed object 128. The information is distinct from interface descriptions 118.

Owner can represent an attribute that returns the owner of managed object 128. The owner can be the entity that deployed the resources underlying managed object 128. For instance, if a company has developed and deployed a resource that can be hosted on a third-party system, the company still owns the associated managed object 128. In addition, if a company has purchased the rights to use and deploy a resource locally, the company owns the resource.

Vendor can represent an attribute that returns the vendor originating managed object 128. In cases where a company has purchased the rights to a resource, the Vendor would be the developer of the resource and the Owner would be the company deploying the resource.

Resource Version can represent an attribute that returns the version of the underlying resource.

Managed Object Version can represent an attribute that returns the version of managed object 128.

Created On can represent an attribute that returns the date and time managed object 128 was created.

Supported Event Types can represent an attribute that returns a list of the event types supported by managed object 128. The events may be subscribed to in either a push or pull mode by calling the appropriate subscribe operation as further described herein.

Supported Relations can represent an attribute that returns a list of the relations supported by managed object 128. Any of the relations in the list may be used to describe relationships between managed object 128 and other managed objects. For example, managed object 128 can support relations such as Contains, ContainedIn, Depends On, Depended Upon, and Corresponds To. Other suitable relations can be utilized.

Managed Object Monitoring Interface can include a Status attribute, which can represent an attribute that returns the status of managed object 128. The status can be represented as a URI. Managed Object Interface Collection 132 can define basic status values supported by all managed objects 128. Other interfaces may define additional status values that may be returned by the Status attribute. The read portion of the Status can represent an attribute that can return in the Managed Object Monitoring Interface, and the write portion of the Status can represent an attribute that can return in the Managed Object Control Interface. Handling the read and write portions of the Status attribute in different interfaces allows the owner of managed object 128 to offer read-only access to the status to one consumer, and read-write access to the status to other consumers.

Managed Object Discovery Interface can include a Relationships attribute and a Get Specific Relationships operation. Relationships can represent an attribute that returns a list of relationships that are currently active for managed object 128. The list of relationships can be dynamic and can change as the underlying resource interacts with other resources. Get Specific Relationships (relation) can represent an operation that returns a list of URIs of managed objects having the relation specified in the argument with managed object 128.

Managed Object Control Interface can be used to modify the state of managed object 128, normally by having the managed resource executing a task. Access to Managed Object Control Interface can be controlled via interface descriptions 118 to allow only managers 102 with acceptable privileges use Managed Object Control Interface. The embodiment of Managed Object Control Interface shown includes Status and Name attributes, which are similar to the Status and Name attributes in the Managed Object Monitoring Interface. Managers 102 with access to Managed Object Control Interface can set the values for the Status and Name attributes, however.

Managed Object Collection Interface can include Get, Set, and Invoke operations, and Members attribute.

Get (select, interface, name) can represent an operation used to query the value of an attribute from members of a collection of managed objects 128. The management interface and the name of the attribute can be specified by the interface and name arguments. Set (select, interface, name, XML value) can represent an operation used to modify the value of an attribute on members of a collection of managed objects 128. The management interface and the name of the attribute are specified by the interface and name arguments. Invoke (select, interface, name, XML arguments) can represent an operation to invoke an operation on members of a collection of managed objects. In the Get, Set, and Invoke operations, the management interface and the name of the attribute can be specified by the interface and name arguments. The select argument can be an XPATH expression that identifies a subset of members of the collection. The arguments argument contains a list of arguments to pass to the operation. The return value can be a list of structures that each contain the return value from the operation or contain fault information that resulted from the invocation on a particular managed object 128.

Members can represent an attribute that returns a list of the members of the collection.

The Event Push Interface can include Push Subscribe and Push Cancel Subscription operations. The operation Push Subscribe (EventTypes, CallbackUrl, ExpirationTime) allows manager 102 to register to receive a notification when any of a list of event types occur. The types of events available for interface collections 116, 132 are determined by manager 102 via the Supported Event Types attribute in the Managed Object Configuration Interface. The return value from the Push Subscribe operation can be a subscription ID, for example. Manager 102 can pass the subscription ID to the Push Cancel Subscription operation to stop receiving notifications for the specified event types. The subscription will expire automatically after the expiration of a pre-specified time period. Manager 102 can invoke the Push Subscribe operation again to continue to receive event notifications.

Pull Subscribe (EventTypes, ExpirationTime) can represent an operation that allows manager 102 to subscribe to receive notifications of specified event types. Managed object 128 can cache events of the types specified for later retrieval using operations such as: GetEventsSinceId, GetEventsSinceDate, and GetEventsRangeByDate. The types of events available for interface collections 116, 132 are determined by manager 102 via the Supported Event Types attribute in the Managed Object Configuration Interface. The return value from the Pull Subscribe operation can be a subscription ID. Manager 102 can pass the subscription ID to the Pull Cancel Subscription operation to stop receiving notifications for the specified event types. The subscription can expire automatically after a prespecified period of time expires, at which time the specified event types will no longer be cached for that subscription. In order to continue to receive events of this type, manager 102 can re-subscribe for the desired event types.

Managed object 128 can save events for all types specified in all subscriptions. If no subscription has specified some event type, all events of that type may be discarded. When a subscription is cancelled or expires, the queued event types may be discarded if no other subscriptions have expressed interest in the same event types. Each implementation can specify the time period to determine when subscriptions expire and how long events are saved before they are discarded.

Pull Cancel Subscription (SubscriptionId) can represent an operation that allows manager 102 to indicate the termination of interest in event types from previously registered subscriptions. The subscription ID passed to this operation can be an identifier such as the ID returned from a previous call to Pull Subscribe.

Get Events Since Id (SubscriptionId, EventId) can represent an operation that retrieves all events that have occurred since the event specified by the EventId. Events of the type specified by the previous subscription can be returned.

Get Events Since Date (SubscriptionId, Date) can represent an operation that retrieves all events that have occurred since the specified date and time. Events of the type specified by the previous subscription can be returned.

Get Events Range By Date (SubscriptionId, StartDate, EndDate) can represent an operation that retrieves all events that occurred in the specified date range. Events of the type specified by the previous subscription can be returned. In order to avoid missing any events, the date range can be inclusive of the endpoints.

Event Callback Interface can be implemented by a subscriber to a push event, such as manager 102.

Event Callback Interface includes Notify (notifications) operation, which can be provided by a subscriber to push events. When managed object 128 undergoes a state change that results in one or more event to which a subscriber has registered, manager 102 can invoke the Notify operation with a corresponding list of notifications.

The preceding types, operations, and attributes are examples of features that can be included in Managed Object Interface Collection 132. Other features can be implemented for Managed Object Interface Collection 132 in addition to, or instead of, the preceding features. Further, the names for the interfaces, attributes, events, operations and other interface features disclosed herein are provided for purposes of illustration only. The same names can be used to represent different features, and other names can be implemented to represent features disclosed herein.

WSEE Managed Objects

Figure 1C:
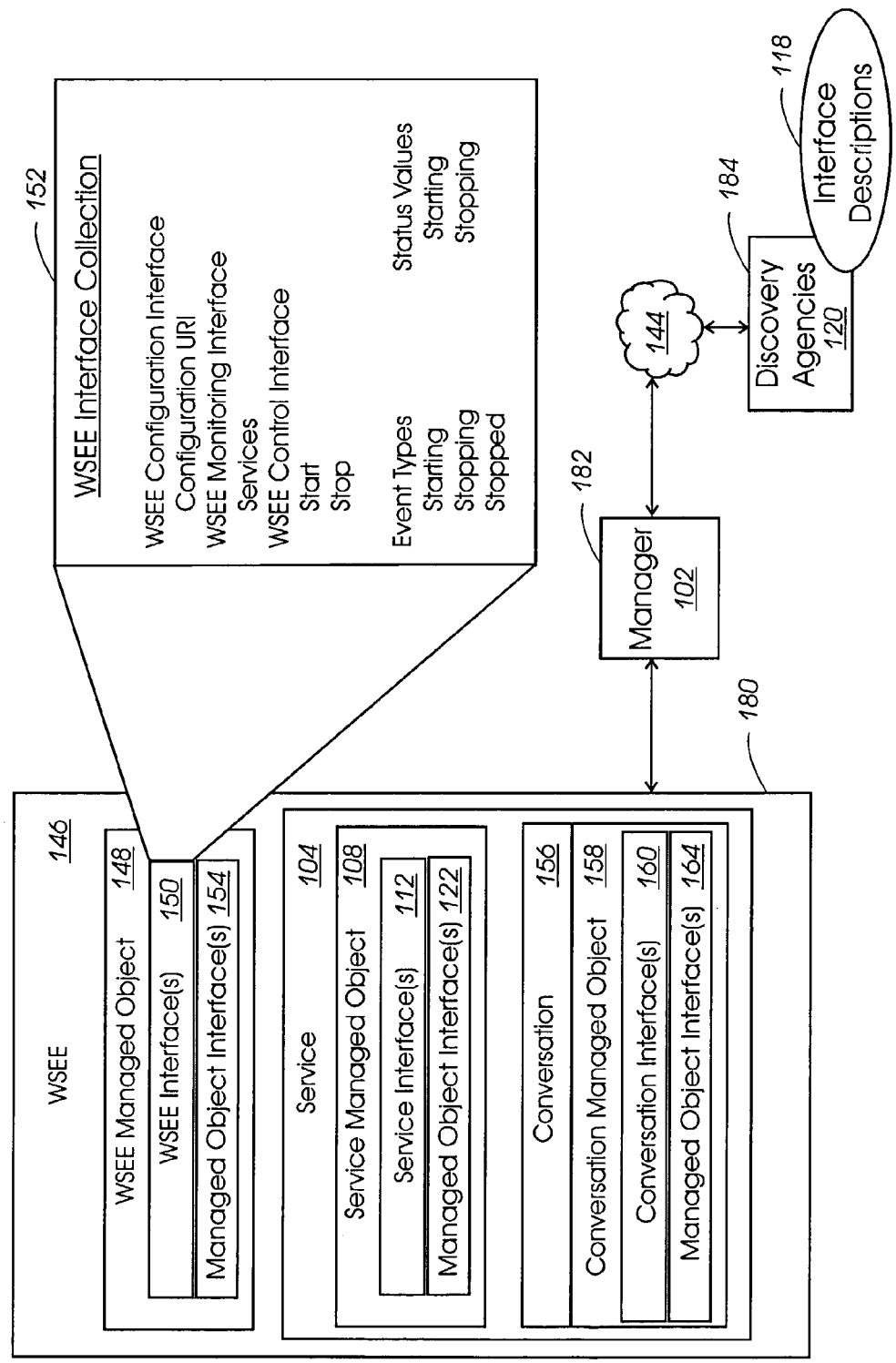
FIG. 1C is a diagram of components included in an embodiment of a Web Service Execution Environment interface collection for the Web service management system of FIG. 1A.

Referring to FIGS. 1A, 1B, and 1C, services 104, 106 are typically executed in processing systems 136 that include an execution environment, such as a Web Service Execution Environment (WSEE) 146, to support operation of services 104, 106. WSEE 146 can include features such as an operating system, databases, script processors, and other components to support services 104, 106. WSEE managed object 148 is a managed object 128 that represents management features of WSEE 146. WSEE managed object 148 can be implemented to notify manager 102 when WSEE 146 starts, stops, and to inform manager 102 of services 104 that can be executed in WSEE 146, for example. WSEE interfaces 150 and managed object interfaces 154 can be configured with features that allow manager 102 to determine whether services 104, 106 are prevented from operating due to a problem with WSEE 146, as well as to monitor and control WSEE 146. Interfaces in one or more categories can be included in WSEE interfaces 150 for each WSEE managed object 148. WSEE managed objects 148 can be implemented within WSEE 146, such as shown for WSEE managed object 148, or in a layer external to WSEE 146, as shown for WSEE managed object 110.

WSEE 146 populates data fields in WSEE interfaces 150 that are available to manager 102. Further, WSEE 146 receives information and control parameters from manager 102 via WSEE interfaces 150. In some embodiments, each collection of WSEE interfaces 150 can support various categories of management capabilities such as monitoring, discovery, control, performance, configuration, and/or security. Other interfaces that support additional WSEE management capabilities can be utilized, in addition to, or instead of, WSEE interfaces 150.

An embodiment of WSEE interfaces 150 is represented in FIG. 1C as WSEE Interface Collection 152. Each interface in WSEE Interface Collection 152 includes at least one management feature that can be used by manager 102 to monitor and/or control various aspects of WSEE 146. Other embodiments of WSEE interfaces 150 can include additional, fewer, or the same features shown in the embodiment of WSEE Interface Collection 152 in FIG. 1C.

In the embodiment shown, WSEE Interface Collection 152 includes a WSEE Configuration Interface, WSEE Monitoring Interface, and WSEE Control Interface. In some embodiments, manager 102 can discover interface descriptions 118 for WSEE interfaces 150 via a suitable discovery agency 120, such as UDDI, or other suitable method. Interface descriptions 118 can be configured to reveal selected management information to manager 102 by exposing only selected interfaces in WSEE interfaces 150. For example, an interface description 118 for WSEE interfaces 150 may only include a description the WSEE Monitoring Interface that can be exposed to manager 102.

Moreover, attributes in WSEE Interface Collection 152 can support types of access by other objects, such as read and read/write. When interface descriptions 118 are implemented in WSDL, WSEE interfaces 150 are mapped to ports, as further described herein. WSEE Interface Collection 152 can also be extended to provide additional management capabilities for manager 102, as described herein.

In the embodiment shown in FIG. 1C, WSEE Configuration Interface includes ConfigurationUri, which can represent an attribute that returns an identifier, such as a URI, to the configuration information for WSEE 146. The Managed Object Configuration interface can be included to provide the configuration information.

In the embodiment shown in FIG. 1C, WSEE Monitoring Interface includes read-only attributes for Services, which returns a list of services 104 currently running in WSEE 146.

WSEE Control Interface can include operations such as Start and Stop that allow Manager 102 to control the execution of WSEE 146. The Start operation can start WSEE 146. If WSEE 146 is already running, no additional action is required. The Stop operation can stop WSEE 146, as well as all other objects contained in WSEE 146, such as service 104 and conversation 156.

WSEE Interface Collection 152 can also include Event types and Status values. Event types shown for example in FIG. 1C include Starting, which can indicate WSEE 146 has just entered the Starting state; Stopping, which can indicate WSEE 146 has just entered the Stopping state; and Stopped, which can indicate WSEE 146 has just completed the Stopping state and is no longer able to process operational requests. Manager 102 can register to receive notification of one or more of the Event types available in WSEE Interface Collection 152.

Status values in WSEE Interface Collection 152 can include values such as Starting and Stopping. The Starting status value can be used when the underlying resource(s) used in WSEE 146 are transitioning from an Inactive state to an Operational state. The Stopping status value can be used when the underlying resource(s) are transitioning from an Operational state to an Inactive state.

The preceding types, operations, status values, and attributes are examples of features that can be included in WSEE Interface Collection 152. Other features can be implemented for WSEE Interface Collection 152 in addition to, or instead of, the preceding features. Further, the names for the interfaces, attributes, events, operations and other interface features disclosed herein are provided for purposes of illustration only. The same names can be used to represent different features, and other names can be implemented to represent features disclosed herein.

Figure 1D:
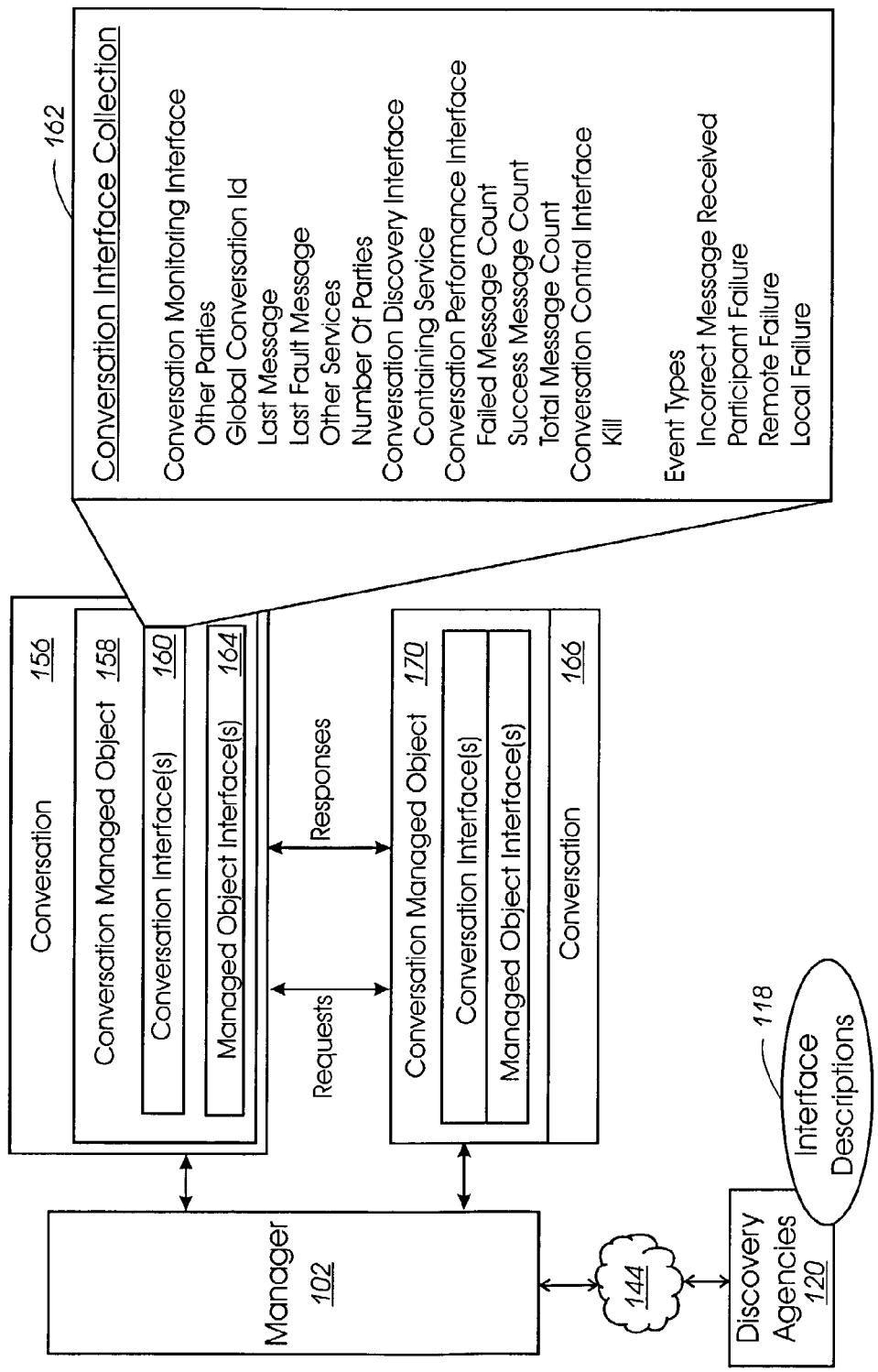
FIG. 1D is a diagram of components included in an embodiment of a conversation interface collection for the Web service management system of FIG. 1A.

Referring to FIGS. 1C and 1D, FIG. 1C shows service 104 containing conversation 156 layered with conversation managed object 158, which represents the management features of resource(s) associated with conversation 156. Similar to service managed object 108, and WSEE managed object 148, conversation managed object 158 can include one or more categories of interfaces in conversation interfaces 160 shown in FIG. 1D as Conversation Interface Collection 162. Conversation interfaces 160 allow manager 102 to access information regarding the state of messages related to corresponding conversations 104. Conversation managed object 158 can also include managed object interfaces 164, which provides the common set of management features that can be implemented by any type of managed object 128.

Service 104 can implement one or more conversations 156, 166. Conversations 156, 166 can communicate with conversations in other services contained in WSEE 146, as well as external to WSEE 146. Conversations 156, 166 and conversation managed object 158, 170 can also be contained in separate WSEEs 146. Some embodiments of Conversation managed objects 158 are further described in the disclosure entitled "System and Method for Managing Conversations", U.S. patent application Ser. No. 10/438,576.

Extending Management Capabilities for Managed Objects

Referring to FIGS. 1B and 1C, in some embodiments, managed object interfaces 130, WSEE interfaces 150, service interfaces 112, and conversation interfaces 160 are exposed to manager 102 through interface descriptions 118. Interface descriptions 118 provide a framework for creating management services for all managed objects 128 regardless of the resources they represent by defining the interfaces to a common format recognized by other managed objects 128 and manager 102. In some embodiments, interface descriptions 118 define the interfaces to Web Services Description Language (WSDL). Other suitable formats can be utilized.

To simplify notation, the term "management interfaces" is used to refer collectively to managed object interfaces 130, WSEE interfaces 150, service interfaces 112, and conversation interfaces 160.

Interface descriptions 118 implemented in WSDL typically define schemas for messages and corresponding WSDL parts; port types; marker attributes; and namespaces. Port types describe a list of potential management capabilities for manager 102. Ports that implement some or all of the port types defined in interface descriptions 118 allow managed objects 128 to expose their management capabilities and provide manager 102 with instructions for using the management capabilities. Managed objects 128 can expose different portions of the management interfaces to different managers 102. Examples of WSDL interface descriptions 118 suitable for use with Service Interface Collection 116 and Managed Object Interface Collection 132 described herein are provided in the Appendix filed with this disclosure.

Extensions can be implemented to the management interfaces to manage additional aspects of the resources associated with respective managed objects 128. In some embodiments, marker attributes for new management port types can be added to corresponding interface descriptions 118 to help identify the management interfaces of managed objects 128.

In the embodiment shown in FIG. 1C, components included in manager 102, WSEE 146, and discovery agencies 120 are implemented in computer processing systems 180 through 184, respectively.

Processing systems 180 through 184 can be any suitable computer-processing device that includes memory for storing and executing logic instructions, and is capable of interfacing with other processing systems. In some embodiments, processing systems 180 through 184 can also communicate with other external components via network 144. Various input/output devices, such as keyboard and mouse (not shown), can be included to allow a user to interact with components internal and external to processing systems 180 through 184.

Additionally, processing systems 180 through 184 can be embodied in any suitable computing device, and so include personal data assistants (PDAs), telephones with display areas, network appliances, desktops, laptops, X-window terminals, or other such computing devices. Processing systems 180 through 184 and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

Logic instructions executed by processing systems 180 through 184 can be stored on a computer readable medium, or accessed by processing systems 180 through 184 in the form of electronic signals. Processing systems 180 through 184 can be configured to interface with each other, and to connect to external network 144 via suitable communication links such as any one or combination of T1, ISDN, or cable line, a wireless connection through a cellular or satellite network, or a local data transport system such as Ethernet or token ring over a local area network.

Service Management Examples

Figure 2:
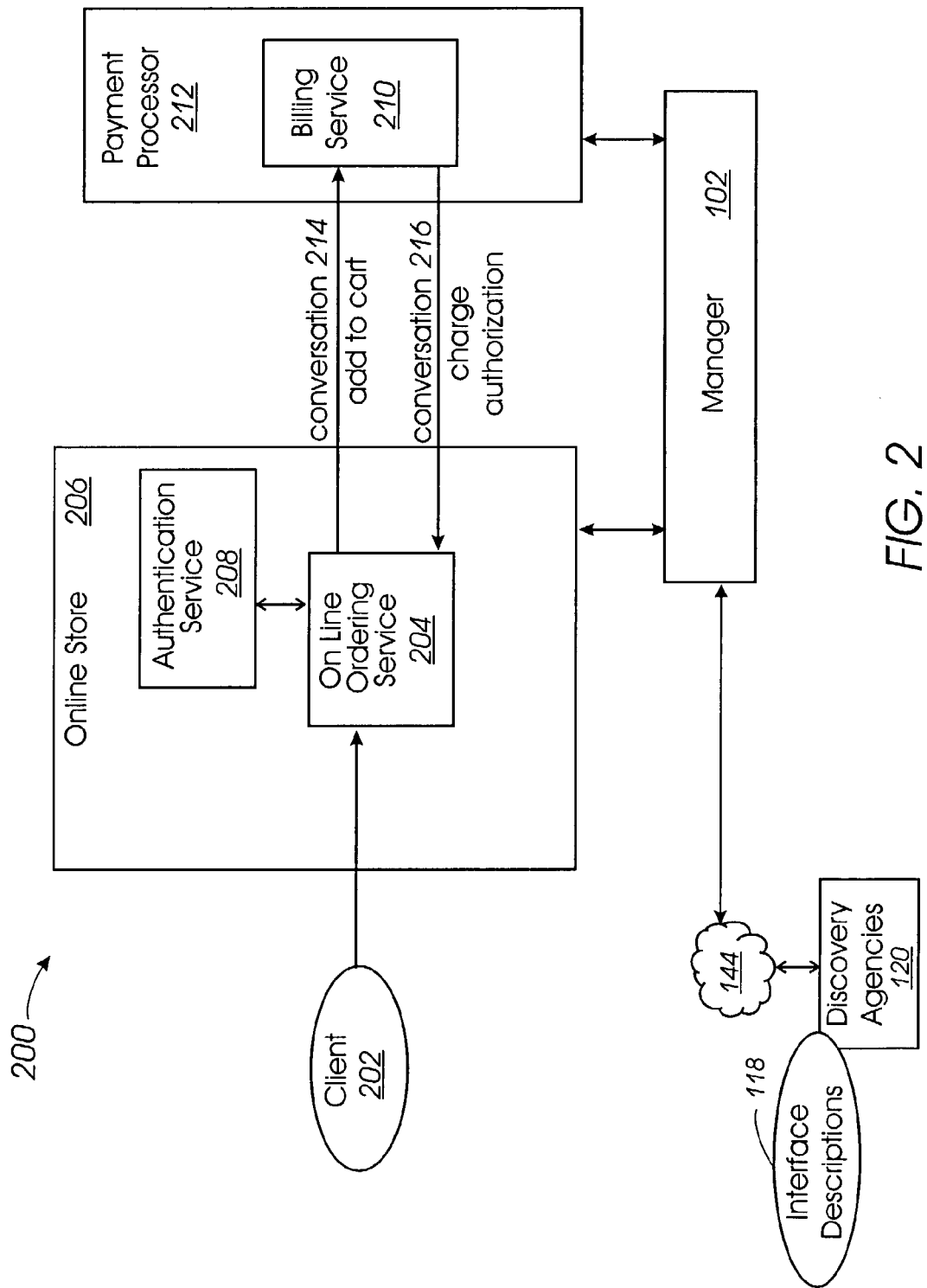
FIG. 2 shows a diagram of components included in an embodiment of an online shopping service system that can utilize the service management system of FIG. 1A.

FIG. 2 shows a diagram of components included in an embodiment of an online shopping service system 200 that can utilize service management system 100 (FIG. 1A). A computer system associated with a purchaser, referred to as client 202, accesses online ordering service 204 at online store 206 via a suitable interface through a network, such as a Web browser interface over the Internet. Online store 206 includes authentication service 208 and online ordering service 204. Online ordering service 204 accesses authentication service 208 and billing service 210.

Billing service 210 can be implemented by a third party in payment processor 212. Information regarding transactions, such as items added to a shopping cart and credit card charge authorizations, can be exchanged via conversations 214, 216 between online ordering service 204 and billing service 210. Authentication service 208 authenticates user identification information and enables users to access information previously supplied to make purchases. Billing service 210 allows the purchaser to pay with a credit card, checking account, or other suitable payment means for one or more items. Payment processor 212 then sends the payment to the vendor's account. Manager 102 can be configured to manage one or more of services 204, 208, 210 and conversations 214, 216.

Figure 3:
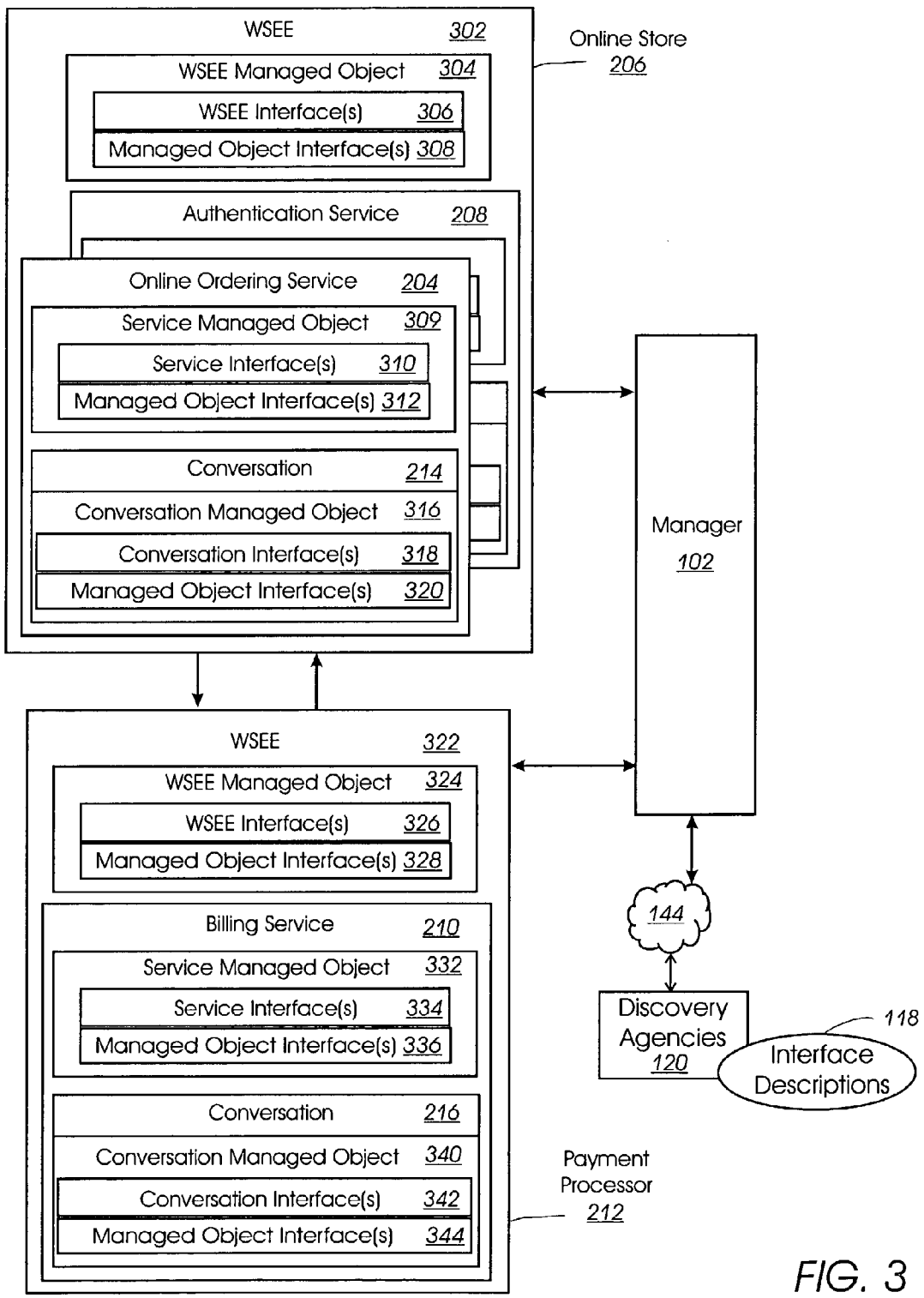
FIG. 3 shows a block diagram of components in online ordering system of FIG. 2 configured with managed objects and corresponding management interfaces.

Referring to FIGS. 2 and 3, FIG. 3 shows online store 206 and payment processor 212 configured with managed objects and management interfaces. Online ordering service 204 and authentication service 208 operate in WSEE 302. WSEE 302 can be configured with WSEE managed object 304, WSEE interfaces 306, and managed object interfaces 308. Online ordering service 204 includes service managed object 302 and conversation 214. Service managed object 309 includes service interfaces 310, and managed object interfaces 312, while conversation managed object 316, conversation interfaces 318, and managed object interface 320 are associated with conversation 214. A suitable set of managed objects and management interfaces can be configured for authentication service 208

With regard to payment processor 212, billing service 210 operates in WSEE 322. WSEE 322 is configured with WSEE managed object 324, WSEE interfaces 326, and managed object interfaces 328. Billing service 204 includes service managed object 332 and conversation 216. Service managed object 332 includes service interfaces 334 and managed object interfaces 336, while conversation managed object 340, conversation interfaces 342, and managed object interface 344 are associated with conversation 216.

Manager 102 can discover interface descriptions 118 to learn about the management capabilities available via the management interfaces. The management capabilities can include features discussed herein for the embodiments of Service Interface Collection 116 (FIG. 1A), Managed Object Interface Collection 132 (FIG. 1B), WSEE Interface Collection 162 (FIG. 1C), and Conversation Interface Collection 116 (FIG. 1D), as well as any extended resource management capabilities that can be included in an implementation.

Manager 102 can be configured to discover interface descriptions 118 for the management interfaces. In some embodiments, manager 102 includes a configuration file with a list of URIs of the locations of interface descriptions 118 for the management interfaces associated with a particular service. Manager 102 can alternatively discover interface descriptions 118 with a UDDI lookup or other suitable discovery method. Once manager 102 discovers a managed object, manager 102 can access the Relationships attribute in the corresponding managed object interface to discover other managed objects that are related to the particular managed object. Manager 102 can access the Container attribute in the service interfaces to retrieve the execution environment interfaces for WSEE managed objects.

Figure 4:
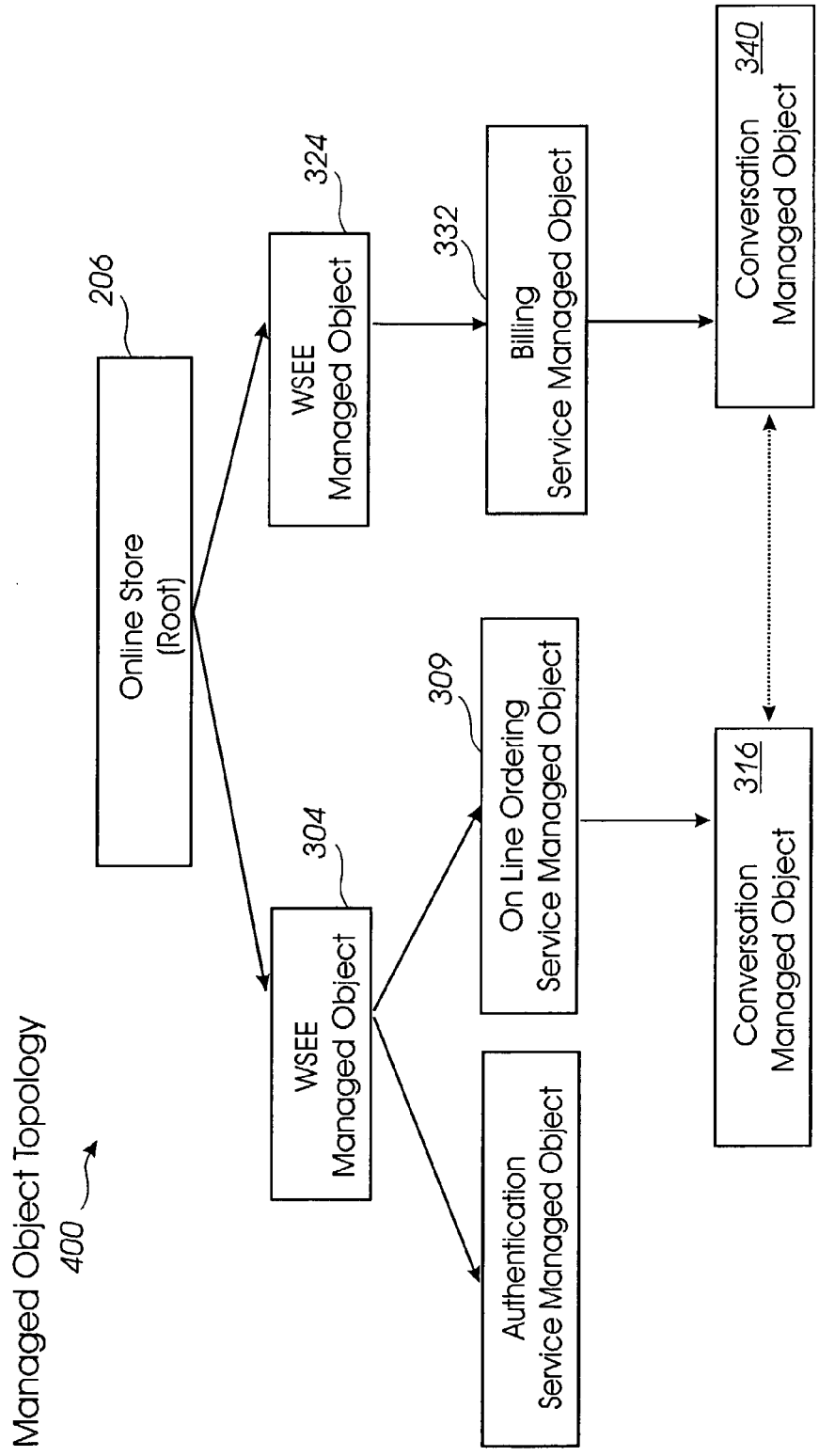
FIG. 4 shows a diagram of the topology of the managed objects of FIGS. 2 and 3.

FIG. 4 shows a topological diagram 400 of the managed objects 304, 309, 316, 324, 332, 340 of FIG. 3, as developed by manager 102. Online store 206 is a root object with respect to other components in online shopping service 200 (FIGS. 2 and 3). Managed objects included on one branch of online store 206 are shown as WSEE 304, authentication service 402, online ordering service 302, and conversation 316. The managed objects on the other branch of online store 206 include WSEE 322, billing service 210, and conversation 340.

Figure 5:
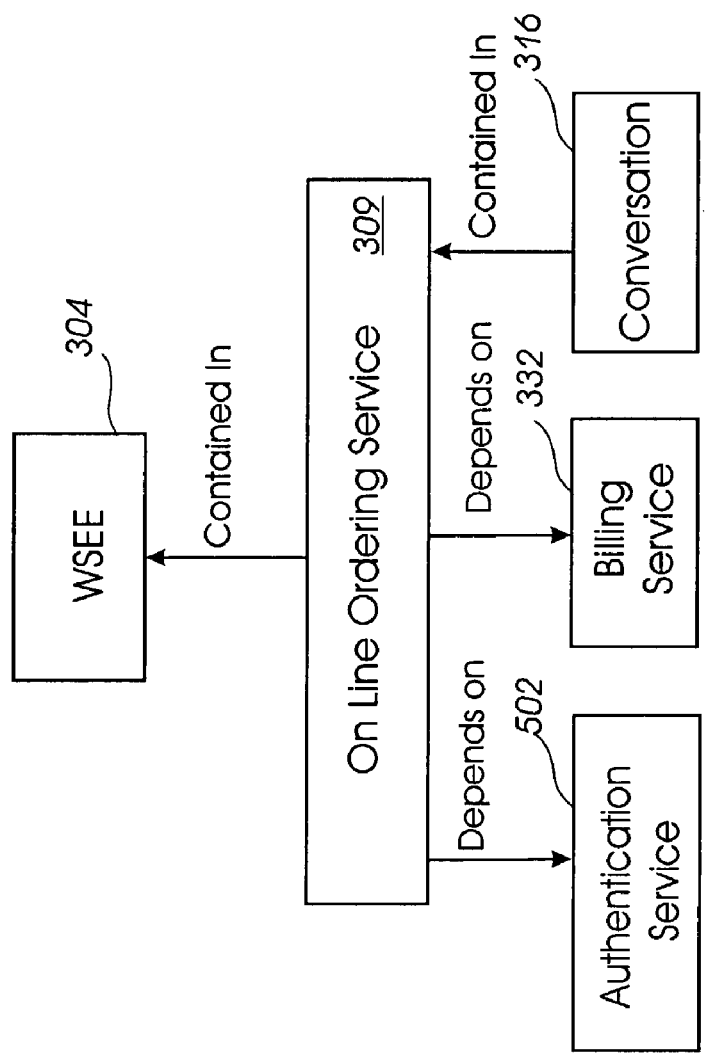
FIG. 5 shows a diagram of the relationships between the managed objects of the online shopping service system of FIGS. 2 and 3.

FIG. 5 shows a diagram of the logical relationships between components in online store 206. As shown, online ordering service managed object 309 is contained in WSEE managed object 304. Online ordering service managed object 309 depends on authentication service managed object 502 and billing service managed object 332. Conversation managed object 316 is contained in online ordering service managed object 309.

Manager 102 can invoke the PushSubscribe and/or PullSubscribe operations in one or more of managed object interfaces 308, 312, 320, 328, 336, 344 to receive notifications from managed objects 304, 309, 316, 324, 332, 340, respectively. As an example of the notification process, assume that manager 102 receives a participant failure notification from conversation 214 via associated managed object interfaces 320. When the error occurs, conversation managed object 316 issues a notification of the event to manager 102. The event severity is critical, for example. When manager 102 receives the notification, a status propagation rule in manager 102 changes the status of the parent nodes to the highest status value of its children.

Figure 6:
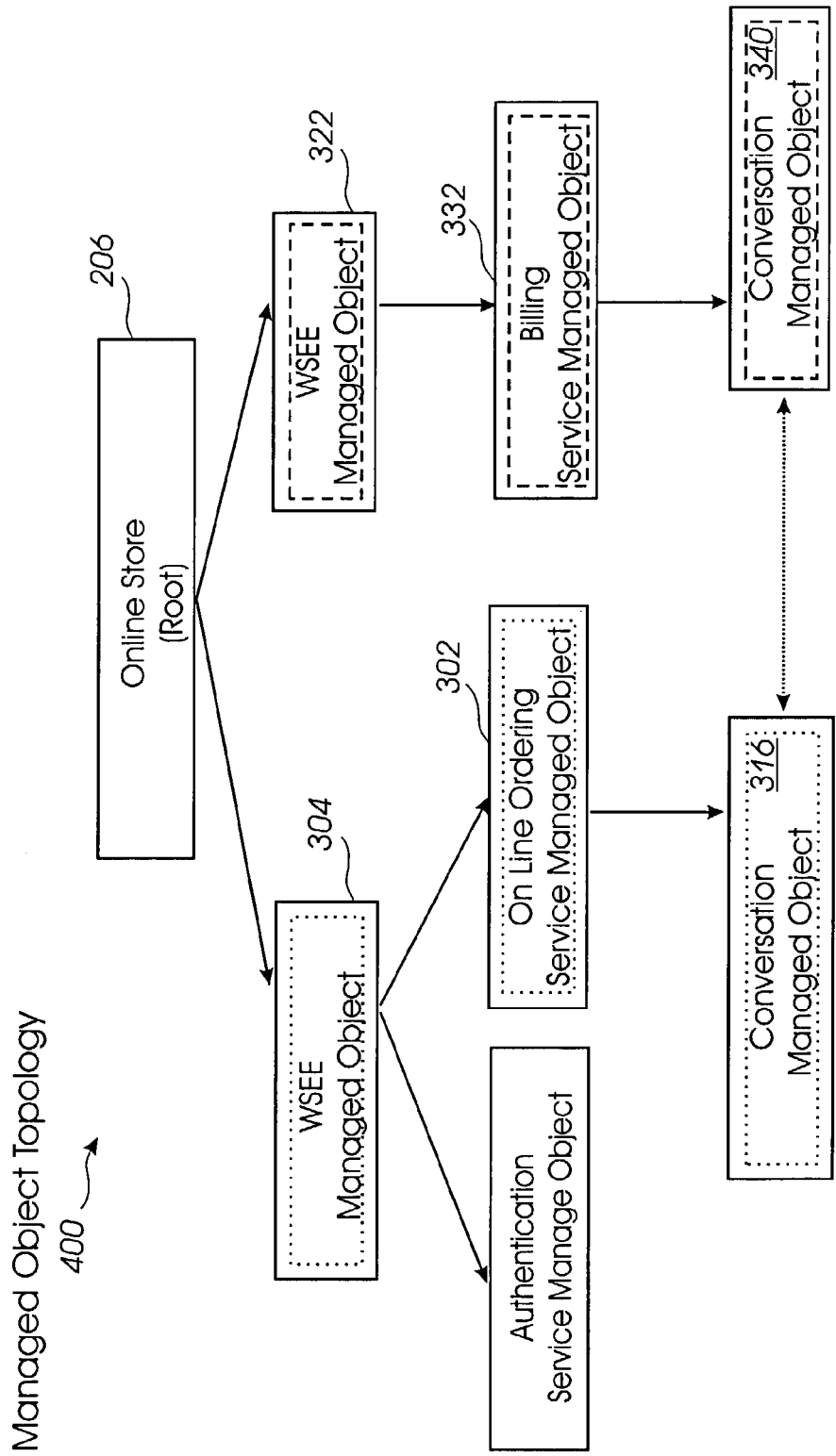
FIG. 6 shows the topological diagram of FIG. 4 showing propagation of failure status among components in online shopping service system of FIG. 2.

To illustrate propagation of the error status among related objects, FIG. 6 shows managed object topological diagram 400 of FIG. 4 with WSEE managed object 304, online ordering service managed object 302, and conversation managed object 316 configured with dotted boxes to indicate a status value associated with a failure. WSEE managed object 322, billing service managed object 332, and conversation managed object 340 are shown with dashed boxes to indicate failure status propagation from conversation managed object 340 to the parent nodes.

To resolve the problem with conversation 214, manager 102 reviews the status and cause of the problem/status change received through the notification. Manager 102 then inspects the notifications, the status values, and the time stamps to determine the notification that caused the status change. Once the source of the status change is determined, manager 102 determines whether it can fix the problem. If the problem cannot be solved without the assistance of a human administrator, manager 102 notifies the administrator of the problem. Once the problem is solved, manager 102 returns status values to normal in managed object interfaces 308, 312, 320, 328, 336, 344.

Figure 7:
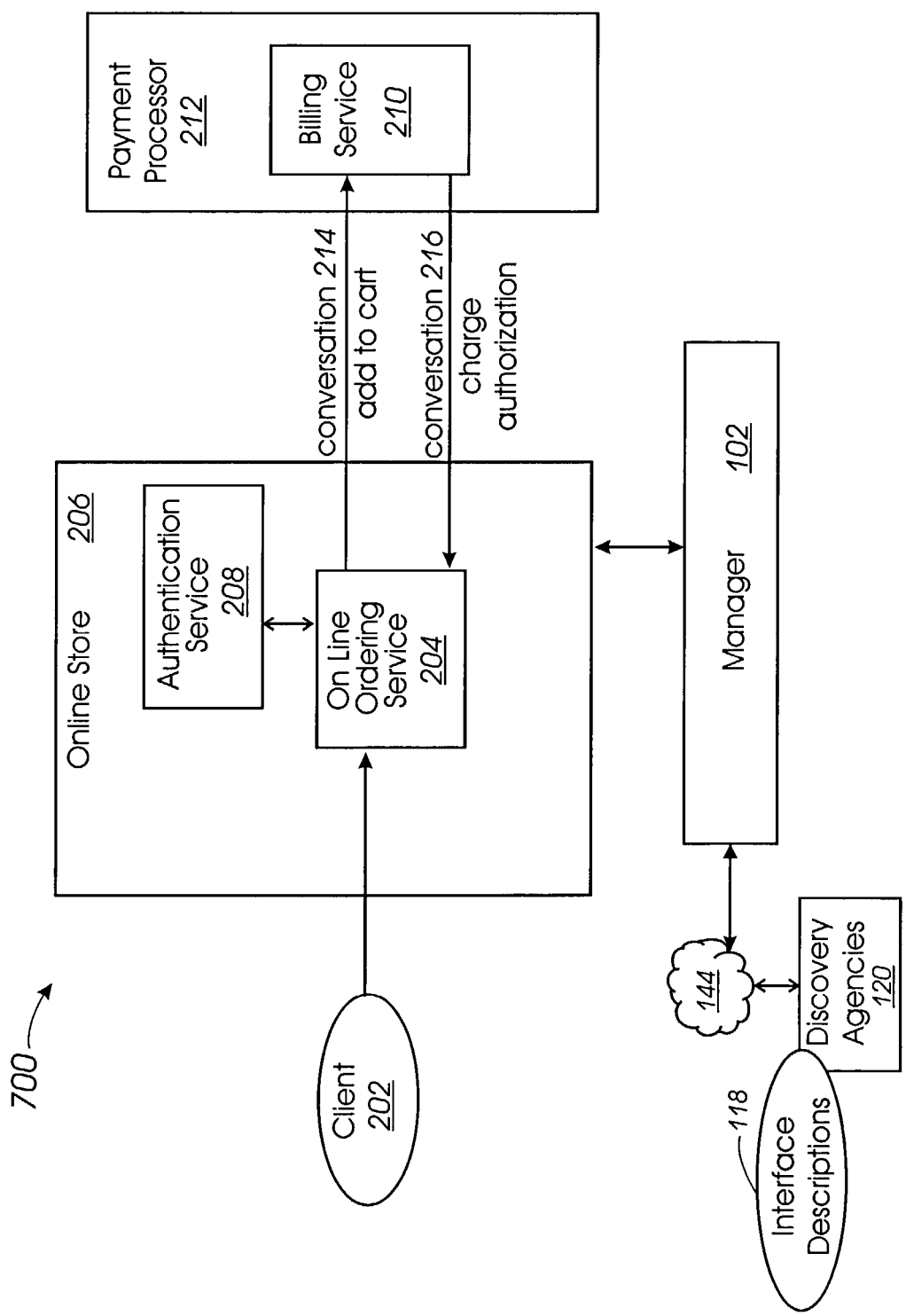
FIG. 7 is a diagram of another embodiment of an online shopping service system that can utilize the service management system of FIG. 1A.

Referring now to FIG. 7, another diagram of an embodiment of online ordering system 700 is shown with manager 102 interfacing with online store 206, but not payment processor 212. Such a situation can arise when payment processor 212 is in a different management domain, for example, or when components in payment processor 212 are not configured with managed objects and management interfaces.

Figure 8:
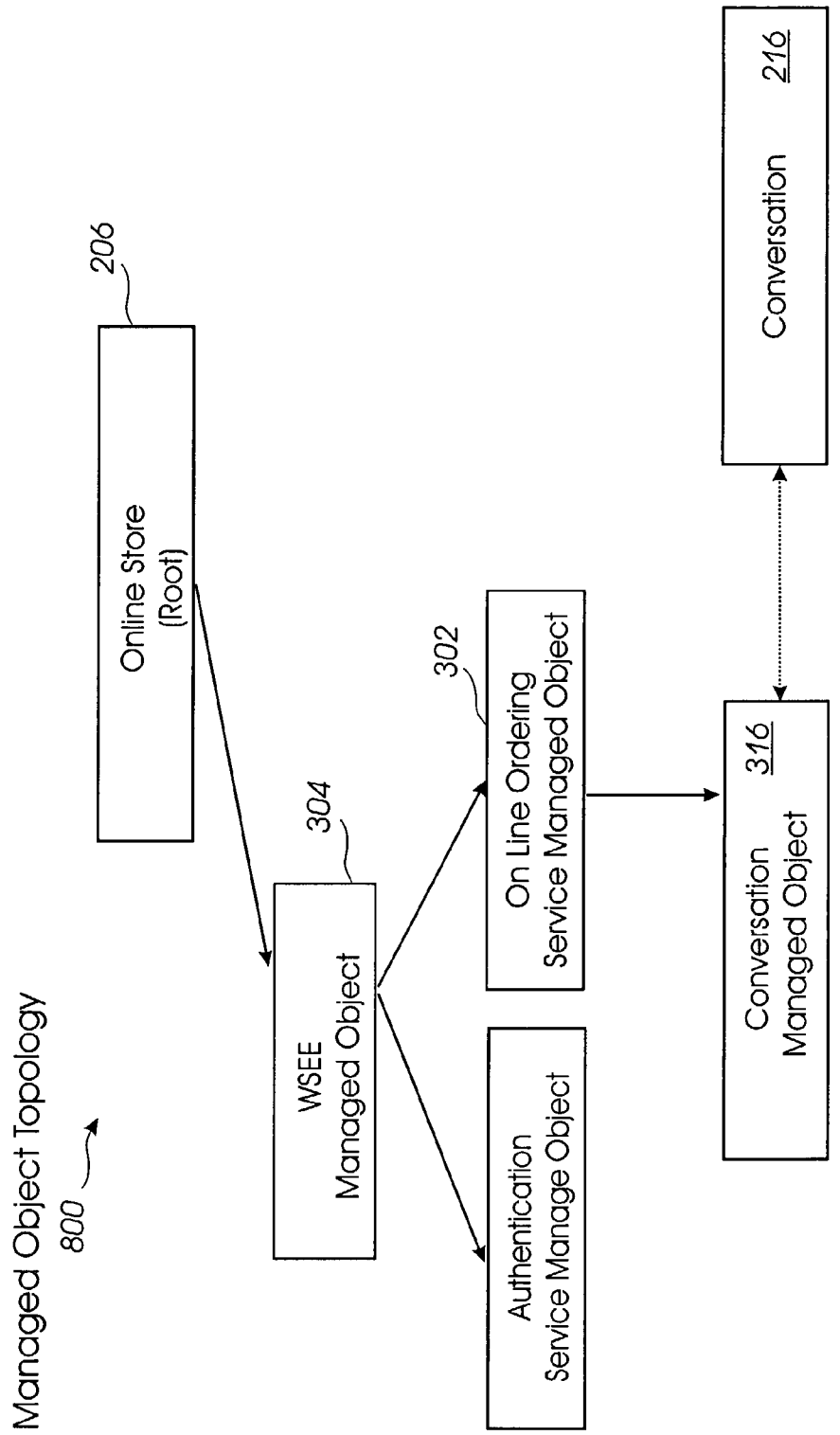
FIG. 8 shows a topological diagram of managed objects in the online ordering system of FIG. 7.

FIG. 8 shows a topological diagram 800 of components in online ordering system 700 in FIG. 7. In the event of a problem with payment processor 212, manager 102 can suspend online store 206 until payment processor 212 resumes operation. Manager 102 can also direct online store 206 to other suitable payment processors to replace payment service 212. For example, assume WSEE 322 (FIG. 3) for billing service 210 experiences a failure. The notification from conversation managed object 316 (FIG. 3) can indicate that conversation 216 has stopped responding. Manager 102 inspects the notifications, their status values, and their time stamps, to determine which notification caused the status change. Since conversation 216 is not responding, and payment service 212 is outside the management domain of manager 102, manager 102 can wait until payment service 212 resumes responding, send a message to the administrator of payment service 212, and/or re-initiate conversation 214 with a similar payment service.

Distributed Business Processes Example

Figure 9:
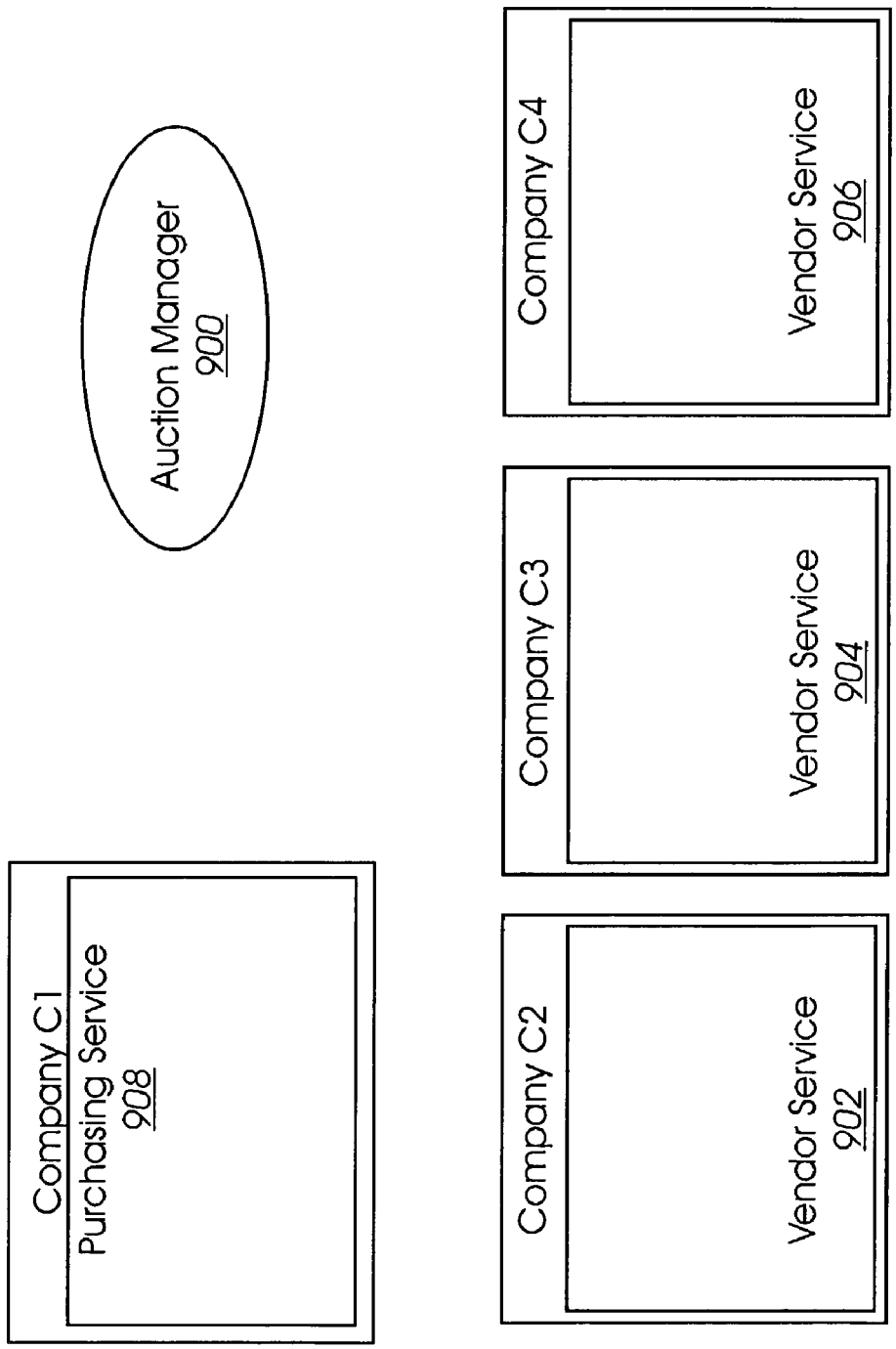
FIGS. 9 and 10 show diagrams of four independent entities capable of coordinating distributed Web services that can be monitored by a manager.
Figure 10:
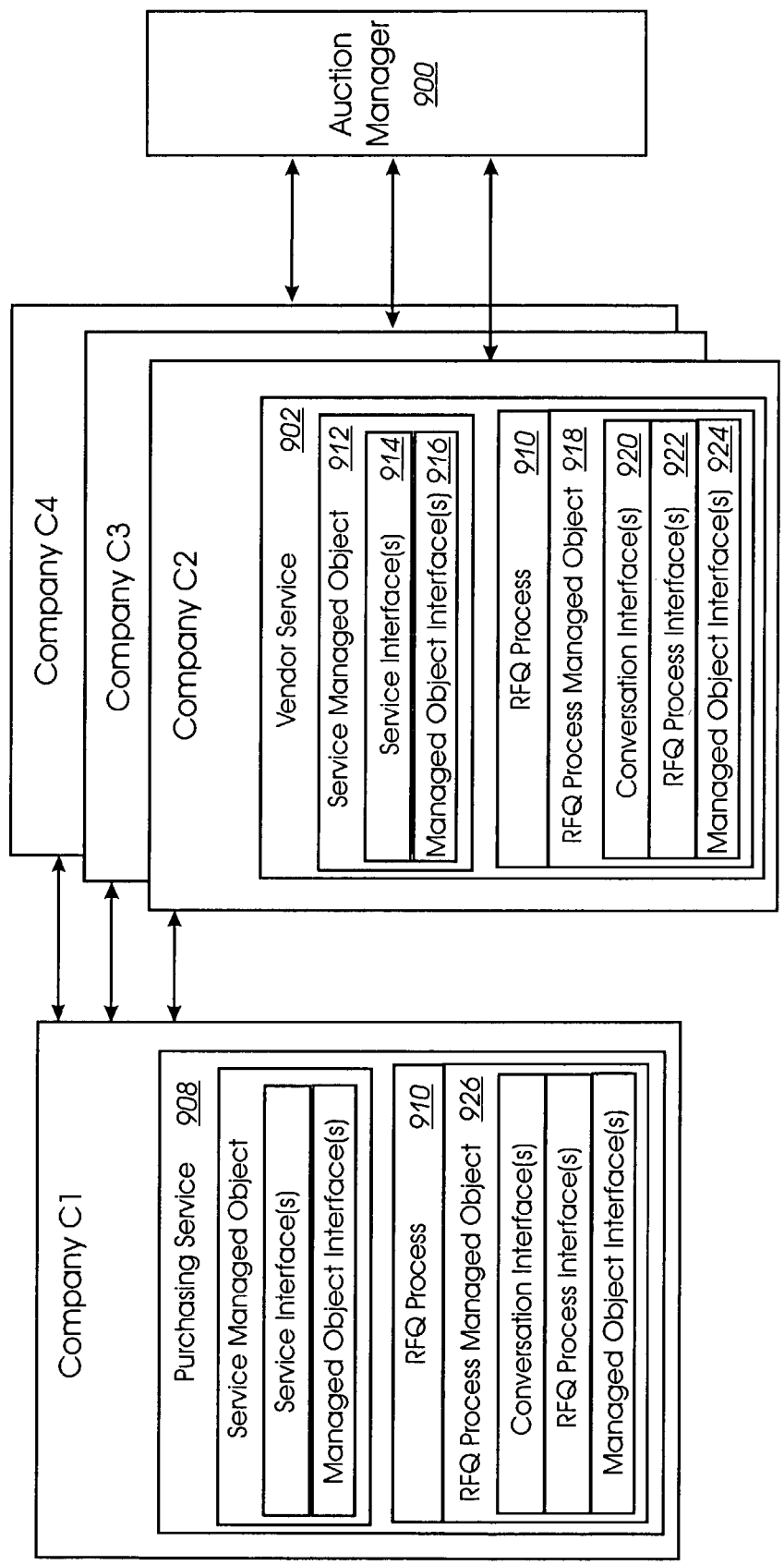

As another example of the use of managed objects to manage Web services, FIGS. 9 and 10 show diagrams of distributed business processes with four independent Web services that can be monitored by auction manager 900. Companies C2, C3, and C4 provide vendor services 902, 904, 906 to bid on items specified in requests for quotes (RFQs) from purchasing service 908 at Company C1. The distributed process of submitting and responding to the RFQs is shown as RFQ Process 910 in FIG. 10.

Auction manager 900 offers a management service that monitors the progress of RFQ Process 910. The business logic and operational processes are performed through purchasing service 908 at Company C1 and vendor service 902, 904, 906 from Companies C2, C3, and C4, respectively.

Auction manager 900 has an agreement with Companies C1, C2, C3, and C4 in which auction manager 900 defines RFQ process 910 for Company C1's purchasing service 908 to submit the RFQ, and for Companies C2, C3, and C4 to respond to the RFQ. In one embodiment, RFQ process 910 is implemented in the Business Processes Execution Language (BPEL). BPEL is an XML-based language designed to enable task sharing for a distributed computing environment, even across multiple organizations, using a combination of Web services. A developer formally describes a business process that will take place across the Web in such a way that any cooperating entity can perform one or more steps in the process the same way. In a supply chain process, for example, a BPEL program might describe a business protocol that formalizes the pieces of information in a product order, and the exceptions that may have to be handled. Other suitable specifications for implementing RFQ process 910 can be utilized, in addition to, or instead of, BPEL.

Auction manager 900 monitors RFQ process 910, which choreographs the flow of messages for the bidding until the bidding terminates. Vendor service 902, which is also representative of vendor services 904 and 906, includes service managed object 912 with service interfaces 914 and managed object interfaces 916. Vendor service 902 also includes RFQ process 910, with RFQ process managed object 918, conversation interfaces 920, RFQ process interfaces 922, and managed object interfaces 924. Managed object interfaces 924 include information regarding RFQ process 910, including the relationship of RFQ process managed object 918 with respect to vendor service managed object 912. Companies C2, C3, and C4 each provide auction manager 900 with a URI pointing to interface descriptions (not shown) for vendor services 902, 904, 906.

RFQ process interfaces 922 is an extension to conversation interfaces 920. RFQ process 910 can therefore use attributes, operations, status values, and notifications defined in conversation interfaces 920 and managed object interfaces 924, as well as the extensions defined specifically for RFQ process 910. For purposes of this example, assume RFQ process interfaces 922 support the following elements:

GetGlobalProcessID operation, which returns the global process ID (URI) for an instance of RFQ process 910. In some embodiments, the global process ID can be the URI contained in the Context/Identifier element defined by WS-Coordination, which is a known framework for coordinating distributed application programs that form Web services. Other suitable identifiers can be used.

GetRFQProcess4ID operation, which returns the URI for a description of managed object interfaces 924 for the specific global process ID returned from the GetGlobalProcessID operation.

ProcessStepCompleted notification, which issues an event notification to subscribing auction managers 900 when specified portions of each RFQ process 910 are completed.

Figure 11:
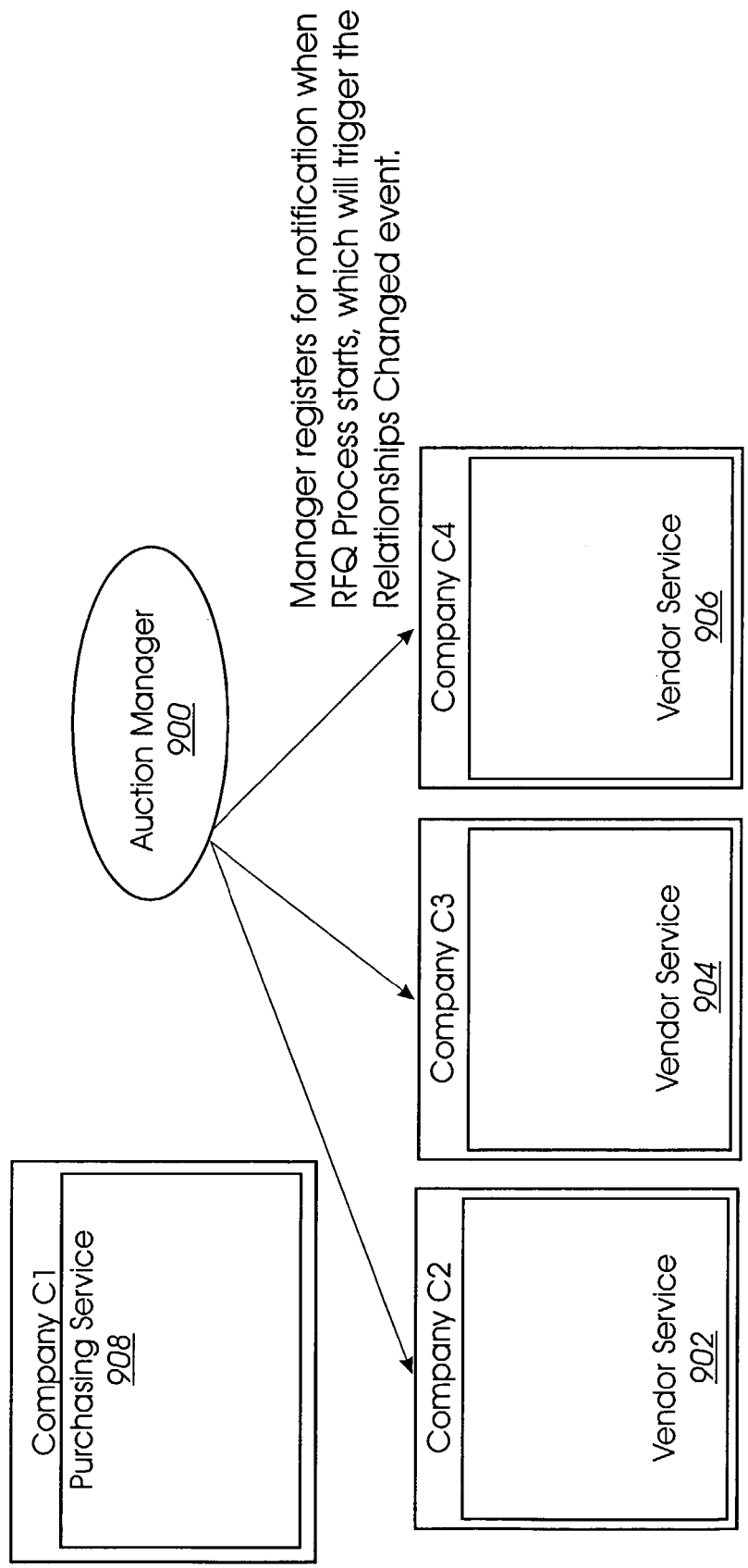
FIGS. 11 through 16 show diagrams of the distributed processing system of FIGS. 9 and 10 with annotations of various steps performed by RFQ process and auction manager.

FIGS. 11 through 16 show diagrams of the distributed services of FIGS. 9 and 10 with annotations of various steps performed throughout the bidding process. Referring to FIGS. 10 and 11, auction manager 900 can use the identifiers pointing to interface descriptions (not shown) that were provided by vendor services 902, 904, 906 to discover interface descriptions for corresponding management interfaces. Auction manager 900 registers for notification with vendor service managed object 912 using the Relationships Changed event notification in managed object interface 916.

Figure 12:
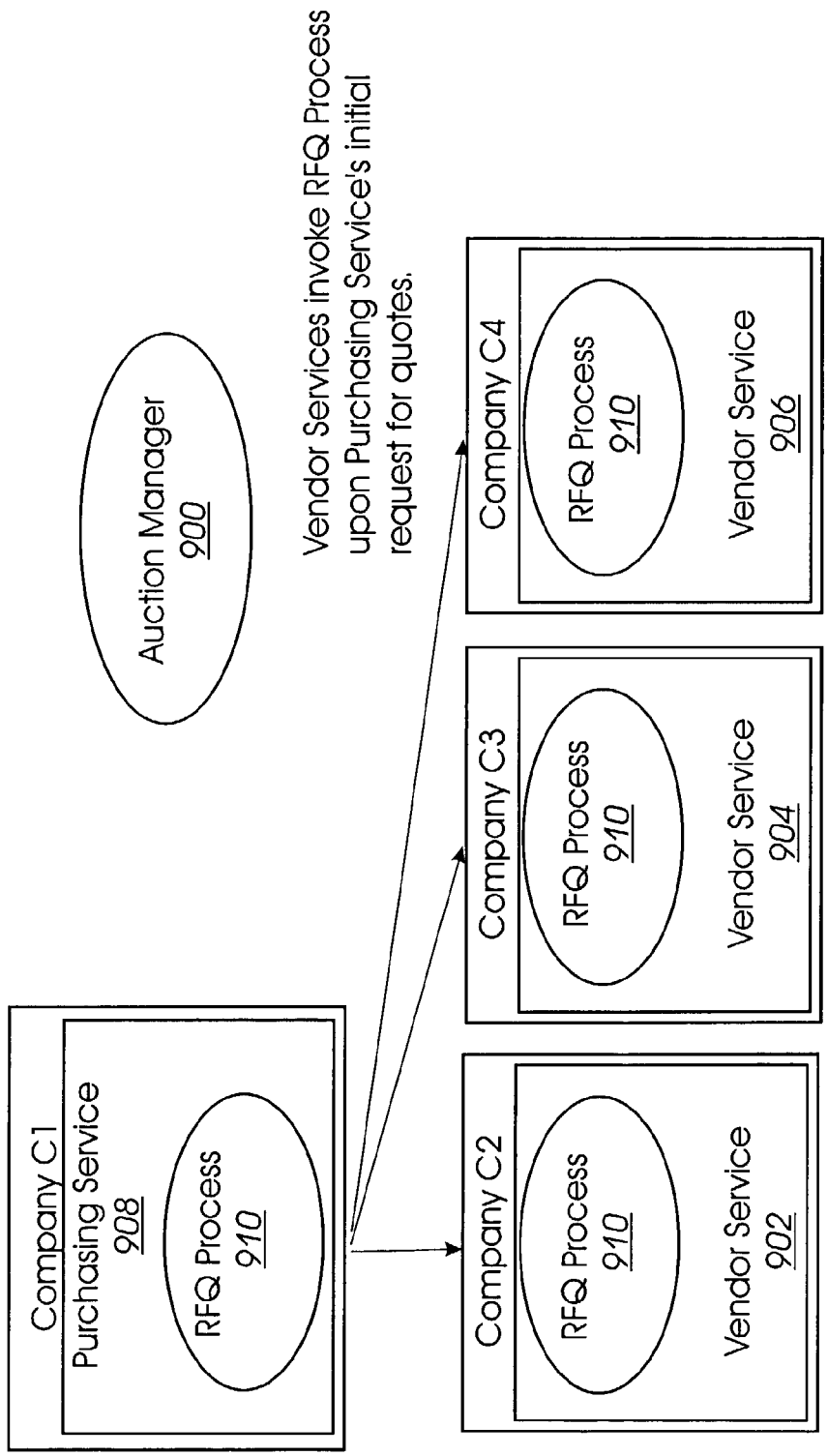

Referring to FIGS. 10 and 12, purchasing service managed object 908 knows that RFQ process 910 is available to buy selected items at a competitive price from participating vendors, such as Companies C2, C3, and C4. Purchasing service 908 knows that auction manager 900 is available to monitor RFQ process 910, but does not necessarily know the identity of auction manager 900.

Based on information in the interface descriptions of RFQ process 910, purchasing service 908 sends a RFQ document to vendor services 902, 904, and 906. Upon receiving the RFQ document, vendor services 902, 904, 906 invoke RFQ process 910, as shown in FIG. 12.

Figure 13:
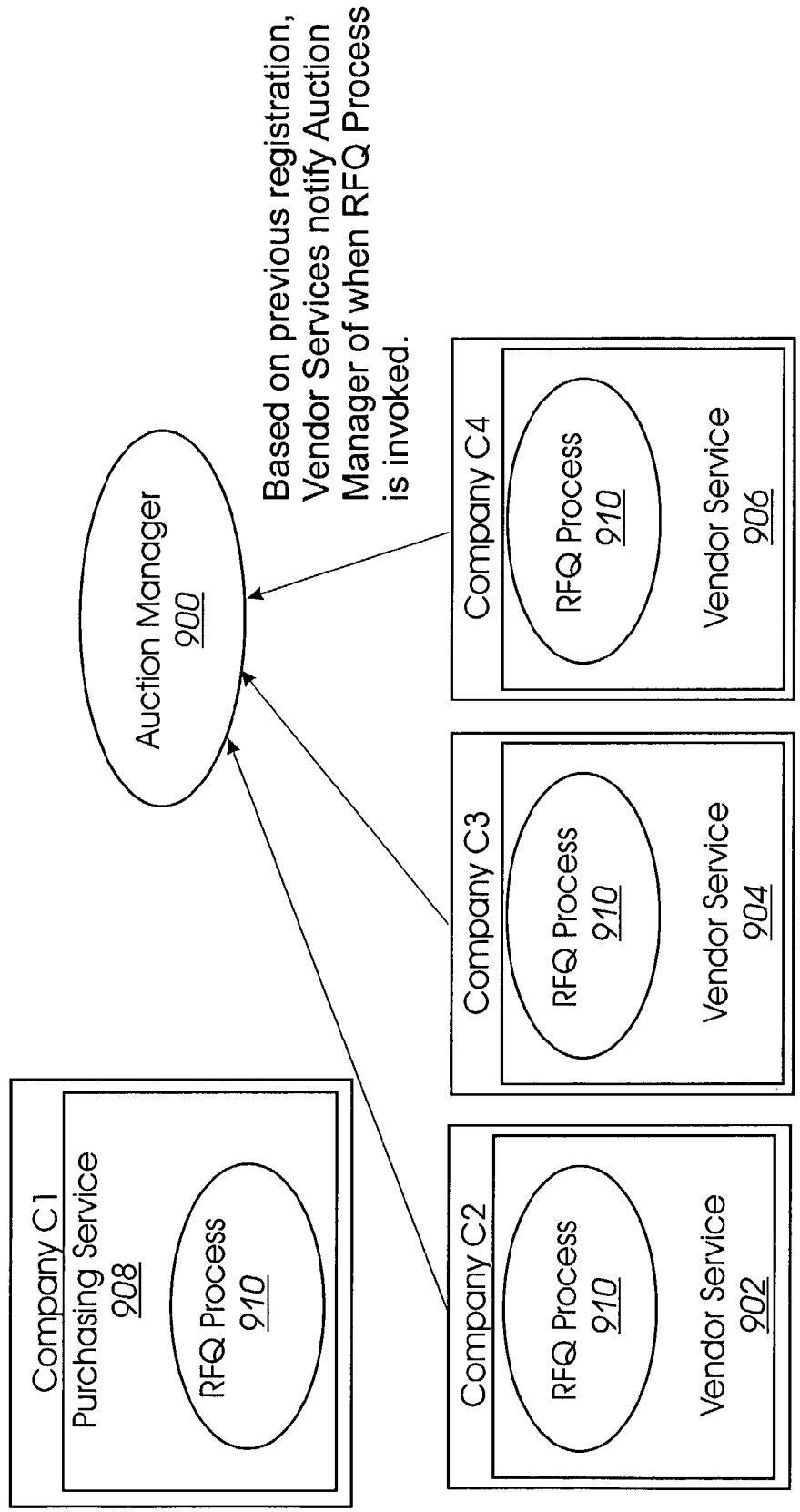

Referring to FIGS. 10 and 13, vendor services 902, 904, 906 send a notification to auction manager 900 when RFQ processes 910 begin executing. The notification includes a link to RFQ Process managed object interfaces 924. When the notification arrives, auction manager 900 retrieves interface descriptions of RFQ Process managed object interfaces 924 using information in the notification. Auction manager 900 can then invoke the management operations exposed in RFQ process interfaces 922, as well as in managed object interfaces 924 and conversation interfaces 920, based on information in the interface descriptions.

Auction manager 900 then calls the getGlobalProcessID operation supported by RFQ process interfaces 922 for each RFQ process 910. The getGlobalProcessID operation returns the same global ID for RFQ process 910, thus allowing the Auction Manager 900 to logically represent the separate instances of RFQ process 910 as the same process. In some embodiments, the global ID can be provided by the use of the WS-Coordination Context, as specified by BPEL. More specifically, the global ID can be the "Identifier" element (a URI) of the Context type defined by WS-Coordination.

Figure 14:
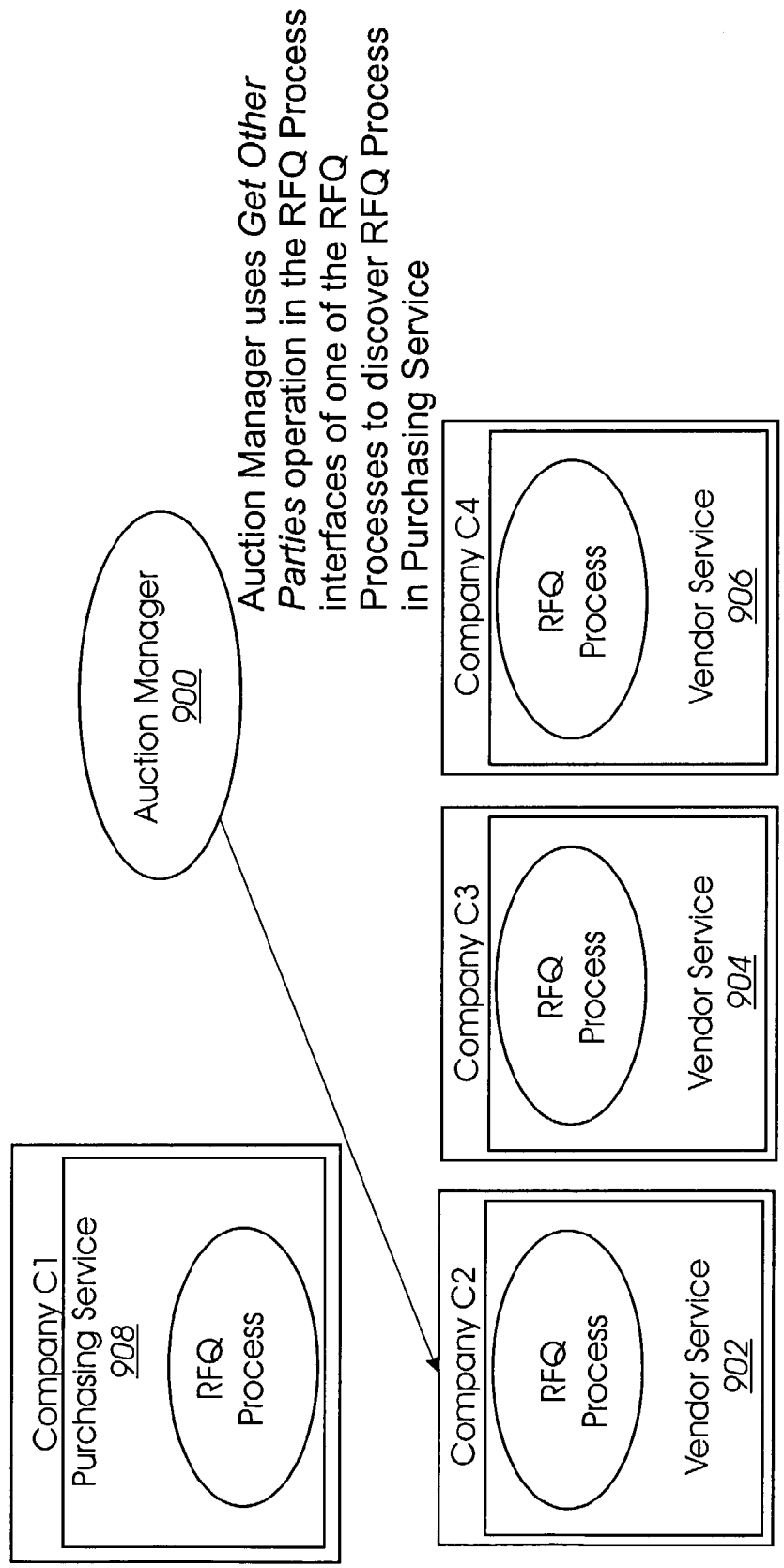

Referring to FIGS. 10 and 14, auction manager 900 invokes the GetOtherParties operation supported by conversation interfaces 920 for one of the three vendor companies. The Get Other Parties operation returns identification for managed objects in the three vendor services 902, 904, 906, plus purchasing service 908. Using this information, auction manager 900 retrieves interface descriptions of managed object interfaces 916 for vendor service managed object 912. Auction Manager 900 then invokes the getRFQProcess4ID operation supported by RFQ process interfaces 922, passing the global process ID provided by the vendors C2, C3, C4. The getRFQProcess4ID operation returns a link to RFQ process managed object 926 for purchasing service 928 to Auction Manager 900.

In situations where the vendors are not aware of each other, auction manager 900 can call the GetOtherParties operation supported by RFQ process managed object 918, which returns IDs for each vendor service 902, 904, 906. Auction manager 900 can then call the GetRFQProcess4ID operation supported by RFQ process interfaces 922 to retrieve a link to managed object interfaces 924 for each vendor service 902, 904, 906.

At this point, discovery is complete and auction manager 900 has discovered vendor service managed objects 912 and RFQ process managed objects 918 for vendor services 902, 904, 906.

Figure 15:
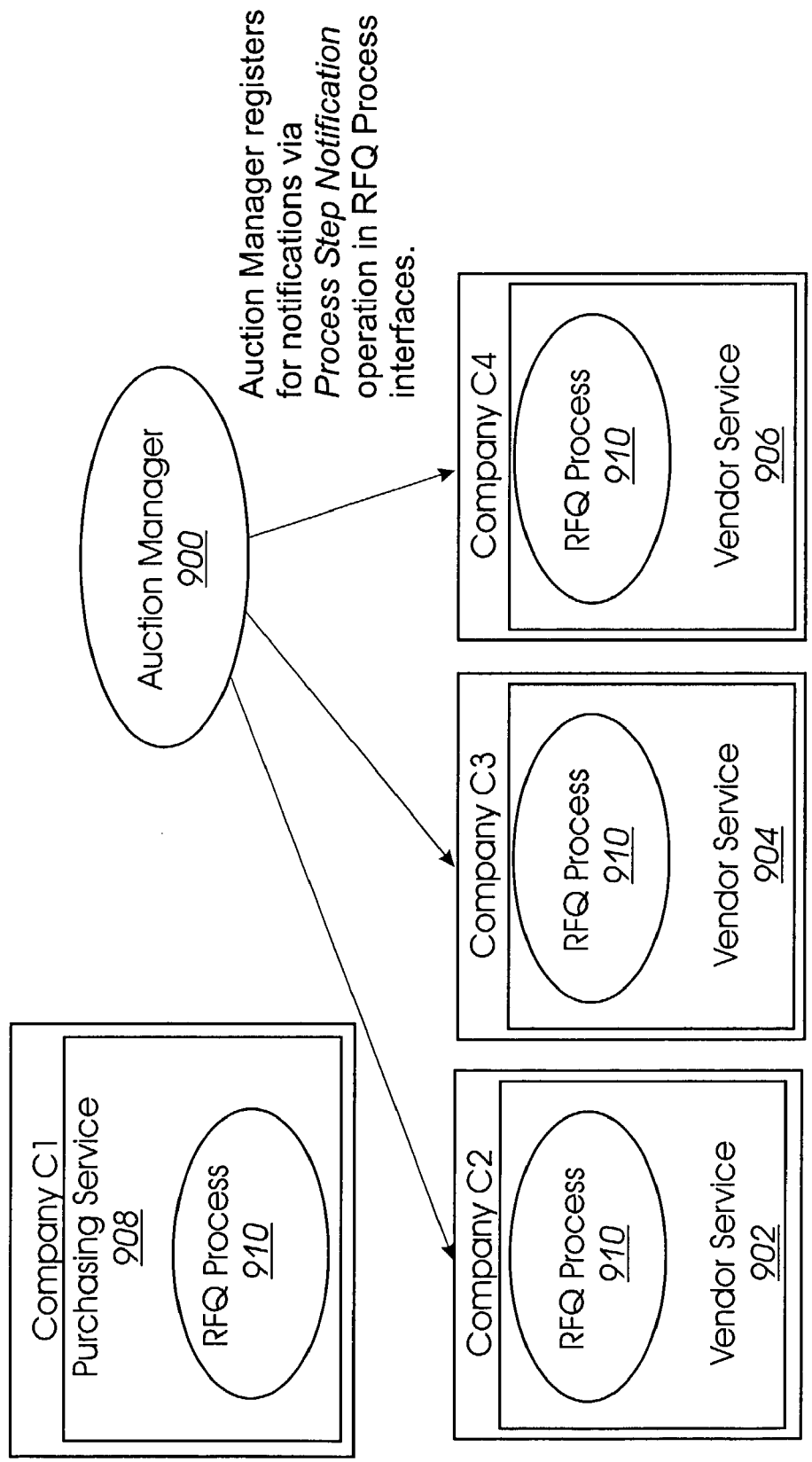

Auction manager 900 then uses the ProcessStepCompleted notification in RFQ process interfaces 922 to register for notification every time a new step is completed, as shown in FIG. 15. In this manner, auction manager 900 can monitor the progress of RFQ process 910.

Figure 16:
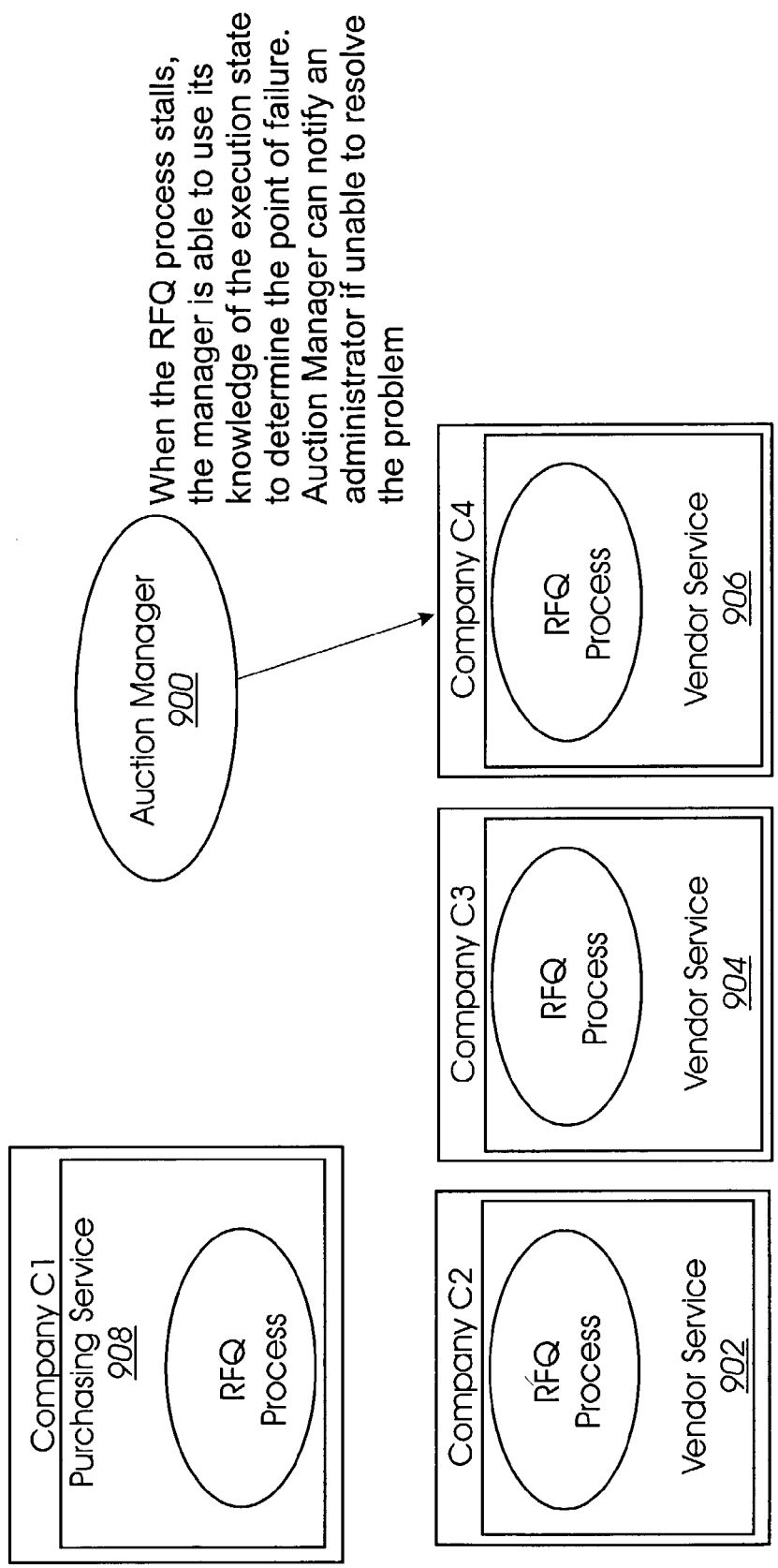

The ProcessStepCompleted notification in RFQ process interfaces 922 continuously updates auction manager 900 as each step in RFQ process object 910 is completed for each vendor service 902, 904, 906. Referring to FIG. 16, if RFQ process object 910 stalls because, for example, vendor service managed object 906 is not sending a message that is expected, auction manager 900 can determine the cause of the problem using information in managed object interface 924 for vendor service managed object 912. Auction manager 900 can send a Status request to vendor service managed object 912. When vendor service managed object 912 does not reply within a prespecified time, the problem can be reported to a human operator at Auction Manager 900. The operator can contact an operator at Company C4 to solve the problem. The transaction can be completed once Company C4 fixes the technical problem.

The logic modules, processing systems, and circuitry described here may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components have been discussed as separate and discrete components. These components may, however, be combined to form larger, smaller, or different software modules, integrated circuits, or electrical assemblies, if desired.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the components and their arrangement are given by way of example only. The configurations can be varied to achieve the desired structure as well as modifications, which are within the scope of the invention. Variations and modifications of the embodiments disclosed herein may be made based on the description set forth herein, without departing from the scope of the invention as set forth in the following claims.

In the claims, unless otherwise indicated the article "a" is to refer to "one or more than one".

We claim:

1. A system for managing a Web service, comprising:
    a computer processor; and
    a service managed object executable on the computer processor, wherein:
        the service managed object is associated with the Web service and includes at least one interface configured to allow a manager to access management features for the Web service; and
        the at least one interface is configured to provide a list of conversations associated with the Web service.

2. The system of claim 1, wherein the at least one interface is further configured to provide information regarding an interface description for the at least one interface.

3. The system of claim 1 wherein the at least one interface is further configured to provide information regarding the relationship of the service managed object to other managed objects.

4. The system of claim 1, further comprising a conversation interface for at least one of the conversations, wherein the conversation interface provides:
    information regarding other managed objects participating in the at least one conversation;
    an identifier associated with the at least one conversation;
    information regarding messages processed by the service;
    identifiers for other services participating in the at least one conversation; and
    the number of other services participating in the at least one conversation.

5. The system of claim 4, wherein the conversation interface further provides information regarding the service that contains the at least one conversation.

6. The system of claim 4, wherein the conversation interface further provides notification of at least one of the following events:
    the at least one conversation received an incorrect message;
    one of the participants in the at least one conversation is missing;
    one of the remote participants in the at least one conversation sent an unexpected fault message; and
    a fault occurred while processing a message for the at least one conversation.

7. The system of claim 4, further comprising a Web service execution environment (WSEE) interface comprising information regarding:
    the configuration of the WSEE; and
    other services that are executable in the WSEE.

8. The system of claim 1, wherein the at least one interface is configured to provide information regarding the response time of the service.

9. The system of claim 1, wherein the at least one interface is configured to allow a manager to control operation of the service.

10. The system of claim 1, wherein the service managed object is configured to notify the manager of the operational status of the service.

11. The system of claim 1, wherein the information is sent to the manager via a simple object access protocol (SOAP).

12. The system of claim 1, further comprising an interface description that describes management capabilities available for the service via the at least one interface.

13. The system of claim 12, wherein the interface description is formatted according to a Web services description language (WSDL).

14. A system capable of managing a Web service, comprising:
    a computer processor configured to communicate with the service, wherein the computer processor includes executable instructions operable to:
        discover a managed object interface for the service;
        discover capabilities for managing the service based on the managed object interface for the service;
        discover a service interface for the service; and
        discover additional capabilities for managing the service based on the service object interface.

15. The system of claim 14, wherein the computer processor includes executable instructions further operable to:
    discover other managed objects related to the service based on the information in the managed object interface.

16. The system of claim 14, wherein the computer processor includes executable instructions further operable to receive information regarding at least one of the group of:
    conversations associated with the service that are in progress;
    the last requested message received by the service;
    the last fault message returned from the service; and
    the execution environment for the service.

17. The system of claim 14, wherein the computer processor includes executable instructions further operable to receive information regarding at least one of the group of:
    the total number of messages the service has received since its creation;
    the number of failed messages processed by the service;
    the number of successful messages processed by the Web service;
    the maximum amount of time that successful operational requests executed before returning a response;
    the minimum amount of time that successful operational requests executed before returning a response;
    the cumulative amount of time that successful operational requests have executed since the service started;

the maximum amount of time that failed operational requests executed before returning a response;
the minimum amount of time that failed operational requests executed before returning a response; and
the cumulative amount of time that failed operational requests have executed since the service started.

18. The system of claim 17, wherein the computer processor includes executable instructions further operable to receive information regarding at least one of the group of:
an operation to start the service;
an operation to restart the service; and
an operation to stop the service.

19. The system of claim 18, wherein the computer processor includes executable instructions further operable to receive information regarding:
a value indicating the operational status of a resource associated with the service; and
an event indicating the a change in the operational status of the resource.

20. The system of claim 19, wherein the computer processor further comprises instructions operable to determine the management capabilities for the service based on:
a first interface description that describes the managed object interface; and
a second interface description that describes the service object interface.

21. The system of claim 20, wherein the first interface description and the second interface description are formatted according to a Web services description language (WSDL).

22. A computer program product tangibly embodied in a computer readable storage medium, comprising:
a service interface; and
a managed object interface associated with the service interface, wherein the service interface is configured to include information for managing a Web service, including information indicating conversations associated with the service that are in progress.

23. The computer program product of claim 22, wherein the service interface is further configured to include information regarding at least one of the group of: the last requested message received by the service; the last fault message returned from the service; and the execution environment for the service.

24. The computer program product of claim 22, wherein the service interface is further configured to include information regarding at least one of the group of: the total number of messages the service has received since its creation; the number of failed messages processed by the service; the number of successful messages processed by the Web service; the maximum amount of time that successful operational requests executed before returning a response; the minimum amount of time that successful operational requests executed before returning a response; the cumulative amount of time that successful operational requests have executed since the service started; the maximum amount of time that failed operational requests executed before returning a response; the minimum amount of time that failed operational requests executed before returning a response; and the cumulative amount of time that failed operational requests have executed since the service started.

25. The computer program product of claim 24, further comprising computer executable instructions operable to exchange messages via the simple object access protocol (SOAP).

26. The computer program product of claim 22, wherein the service interface is further configured to include at least one of the group of: an operation to start the service; and an operation to stop the service.

27. The computer program product of claim 22, wherein the service interface is further configured to include: at least one of the group of: a status value indicating the service's underlying resource is in the process of transitioning from terminated to operational status; and a status value indicating the service's underlying resource is in the process of transitioning from operational to inactive; and at least one of the group of: an event indicating the service is starting; an event indicating the service is stopping; and an event indicating the service has stopped.

28. The computer program product of claim 22, further comprising a service interface description that describes the service interface.

29. The computer program product of claim 28, wherein the extension to the service interface exposes management information regarding a business transaction.

30. The computer program product of claim 22, further comprising:
an extension to the service object interface to expose additional service management capabilities for the service.

31. The computer program product of claim 30, wherein the service interface description is formatted according to a Web services description language (WSDL).

32. The computer program product of claim 31, wherein the extension to the service interface is implemented by including another port type in an interface description for the extension.

33. A method for managing a service, comprising:
creating a service object representing the service, wherein the service object includes a management interface;
exposing management capabilities for the service via a description of the management interface; and
allowing a manager to subscribe to receive notification of events regarding the service.

34. The method of claim 33 further comprising:
providing information regarding the service including:
information indicating conversations associated with the service;
messages processed by the service;
the execution environment for the service; and
the response time of the service.

35. The method of claim 33 further comprising:
allowing a manager to control operation of the service.

36. An apparatus for managing a service, comprising:
interface means for representing management capabilities for the service; and
description means for exposing a selection of the management capabilities for the service to a manager.

37. The apparatus of claim 36, further comprising:
means for allowing a manager to subscribe with the service object to receive notification of events regarding the service.

38. The apparatus of claim 37 further comprising:
means for providing information indicating conversations associated with the service;
means for providing information regarding messages processed by the service; and
means for providing information indicating the response time of the service.

39. The apparatus of claim 36 further comprising:
means for allowing a manager to operate the service.

* * * * *

UNITED STATES PATENT AND TRADEMARK OFFICE
CERTIFICATE OF CORRECTION

| | | |
|---|---|---|
| PATENT NO. | : 7,925,981 B2 | Page 1 of 1 |
| APPLICATION NO. | : 10/438716 | |
| DATED | : April 12, 2011 | |
| INVENTOR(S) | : M. Homayoun Pourheidari et al. | |

It is certified that error appears in the above-identified patent and that said Letters Patent is hereby corrected as shown below:

In column 21, line 19, in Claim 19, delete "the a" and insert -- the --, therefor.

Signed and Sealed this
Second Day of August, 2011

David J. Kappos
*Director of the United States Patent and Trademark Office*